(12) United States Patent
Griffin et al.

(10) Patent No.: US 6,293,301 B1
(45) Date of Patent: Sep. 25, 2001

(54) BACKFLOW PREVENTION DEVICE ENCLOSURE HAVING IMPROVED ACCESS

(75) Inventors: Herman W. Griffin, Mt. Juliet; Edgar L. Cantrell, Lebanon, both of TN (US)

(73) Assignee: Griffin & Cantrell Company, Inc., Juliet, TN (US)

( * ) Notice: Subject to any disclaimer, the term of this patent is extended or adjusted under 35 U.S.C. 154(b) by 0 days.

(21) Appl. No.: 09/559,537

(22) Filed: Apr. 28, 2000

Related U.S. Application Data

(63) Continuation-in-part of application No. 09/100,032, filed on Jun. 19, 1998, which is a continuation-in-part of application No. 08/820,196, filed on Mar. 19, 1997, now Pat. No. 5,996,611, which is a continuation-in-part of application No. 08/743,939, filed on Nov. 5, 1996, now Pat. No. 5,740,832, which is a continuation-in-part of application No. 08/743,940, filed on Nov. 5, 1996, now Pat. No. 5,743,289.

(51) Int. Cl.[7] .................................................. F16K 49/00
(52) U.S. Cl. ..................... 137/377; 137/382; 137/375; 137/341
(58) Field of Search ................................ 137/341, 375, 137/377, 382

(56) References Cited

U.S. PATENT DOCUMENTS

| | | | |
|---|---|---|---|
| Re. 33,523 | 1/1991 | Devine ................................. | 137/341 |
| 356,448 | 1/1887 | Clark . | |
| 1,204,464 | 11/1916 | Lofton . | |
| 1,322,014 | 11/1919 | Hanna . | |
| 1,758,640 | 5/1930 | Banks . | |
| 1,912,022 | 5/1933 | Thompson . | |
| 1,941,443 | 12/1933 | Moran et al. ........................... | 251/59 |
| 2,600,554 | 6/1952 | Lyons ..................................... | 299/58 |
| 2,875,779 | 3/1959 | Campbell .............................. | 137/529 |
| 2,937,009 | 5/1960 | Anderson .............................. | 257/122 |
| 3,120,600 | 2/1964 | True ....................................... | 219/38 |
| 3,294,116 | 12/1966 | Tremeau .............................. | 137/541 |
| 3,313,241 | 4/1967 | Newman .............................. | 103/221 |
| 3,784,785 | 1/1974 | Noland ................................. | 219/301 |
| 3,927,860 | 12/1975 | Smith et al. ............................ | 251/75 |
| 4,110,603 | 8/1978 | Peterson .............................. | 219/535 |
| 4,129,144 | 12/1978 | Andersson et al. ................... | 137/541 |
| 4,176,681 | 12/1979 | Mackal ............................ | 137/516.29 |
| 4,259,981 | 4/1981 | Busse .................................... | 137/375 |
| 4,278,115 | 7/1981 | Briles et al. ............................ | 141/86 |
| 4,368,756 | 1/1983 | Carlson ................................. | 137/541 |
| 4,520,852 | 6/1985 | Klein ..................................... | 141/86 |
| 4,556,080 | 12/1985 | Picaud ................................. | 137/296 |
| 4,558,206 | 12/1985 | Ball ....................................... | 219/301 |
| 4,646,783 | 3/1987 | Bazan et al. ..................... | 137/533.11 |
| 4,716,926 | 1/1988 | Jacobs ................................. | 137/375 |
| 4,726,394 | * 2/1988 | Devine ................................. | 137/341 |
| 4,798,239 | 1/1989 | Persohn et al. ......................... | 165/45 |
| 4,890,638 | 1/1990 | Davenport ............................ | 137/382 |
| 4,993,450 | 2/1991 | Dunn ................................... | 137/382 |
| 5,078,171 | 1/1992 | Moore et al. ........................... | 137/15 |
| 5,150,730 | 9/1992 | Campbell et al. ..................... | 137/364 |
| 5,188,294 | 2/1993 | Sealy et al. ............................ | 239/310 |
| 5,520,207 | 5/1996 | Newsome et al. .................... | 137/153 |
| 5,609,784 | 3/1997 | Davenport ............................ | 219/385 |
| 5,687,757 | 11/1997 | Heintz et al. ......................... | 137/382 |
| 5,740,832 | 4/1998 | Griffin et al. ......................... | 137/341 |
| 5,743,289 | 4/1998 | Griffin et al. ......................... | 137/341 |
| 5,996,611 | 12/1999 | Griffin et al. ......................... | 137/341 |
| 6,021,804 | 2/2000 | Griffin et al. ......................... | 137/341 |

OTHER PUBLICATIONS

Prior art photo of Hot Box enclosure, 1996.

\* cited by examiner

*Primary Examiner*—A. Michael Chambers
(74) *Attorney, Agent, or Firm*—W. Jackson Matney, Jr.; Milbank, Tweed, Hadley & McCloy LLP

(57) ABSTRACT

An apparatus for maintaining the temperature of material contained in fluid conveying devices. The apparatus may include an enclosure having an improved door, mounting bracket, locking mechanism, heating device and a secure structure for accessing the upper portion of the enclosure. An alignment guide and integral tabs are also disclosed which facilitate assembly of the enclosure. A shield-support-bottom enclosure, which allows greater access for maintenance, is disclosed.

24 Claims, 17 Drawing Sheets

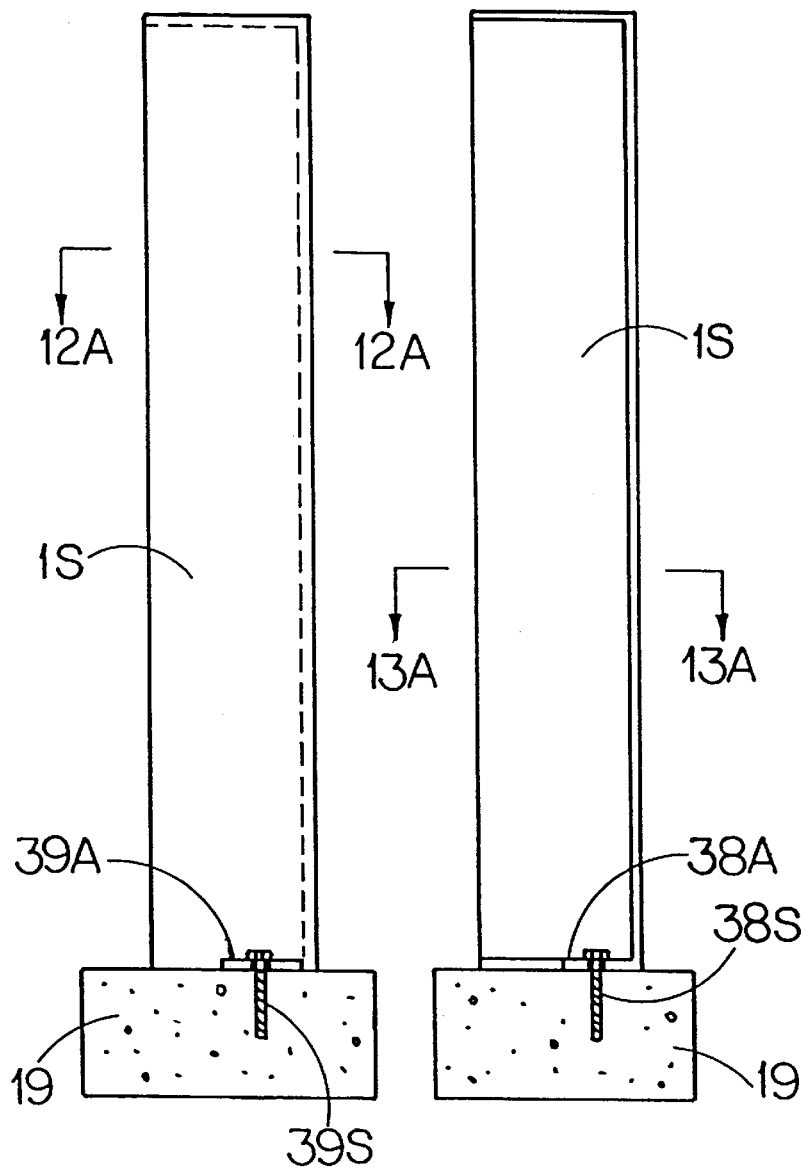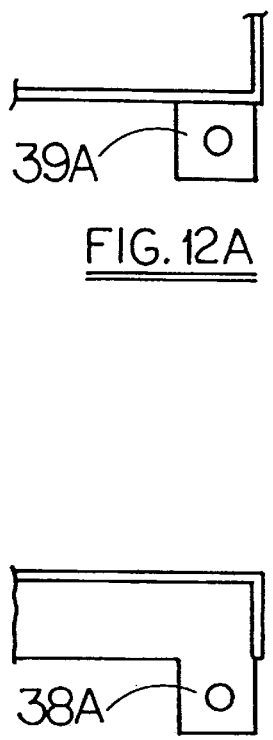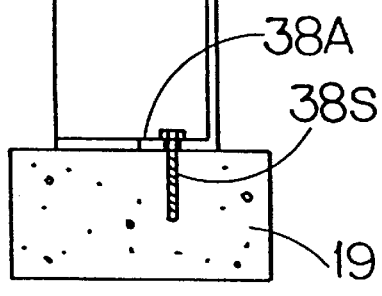

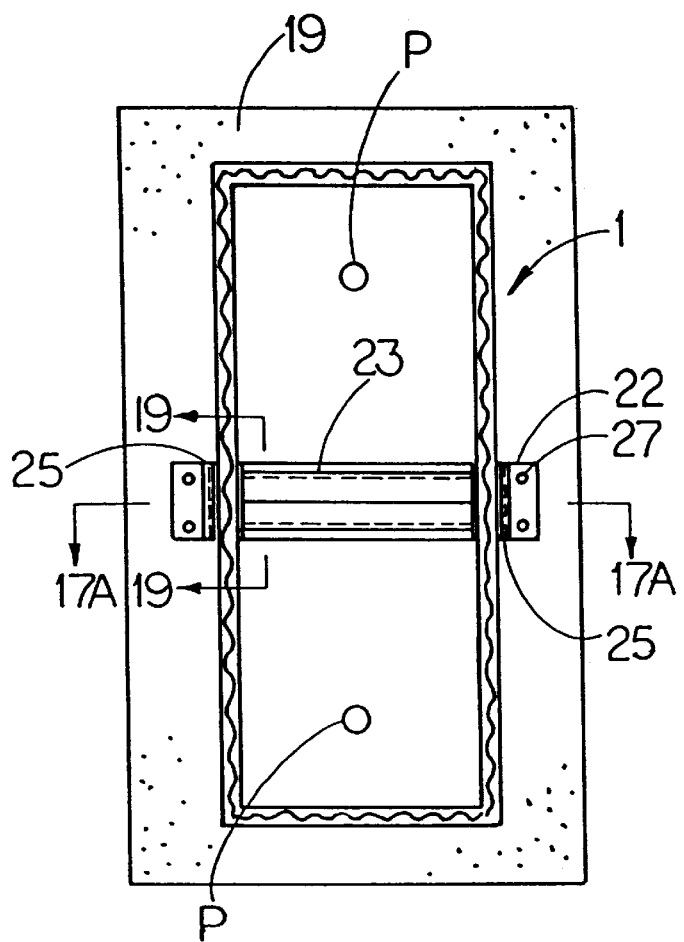
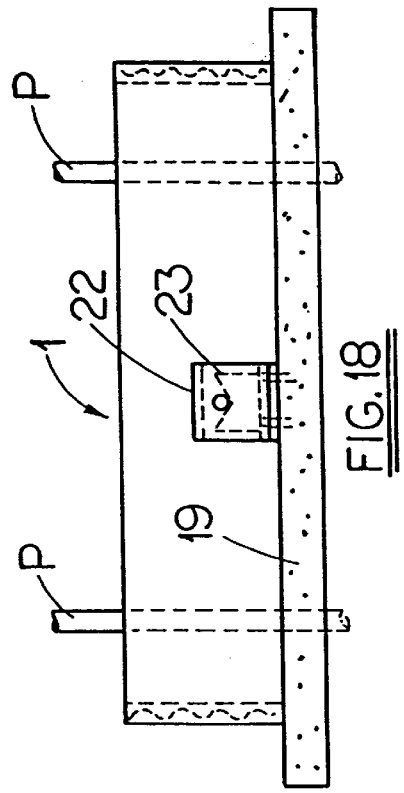
FIG. 17         FIG. 18
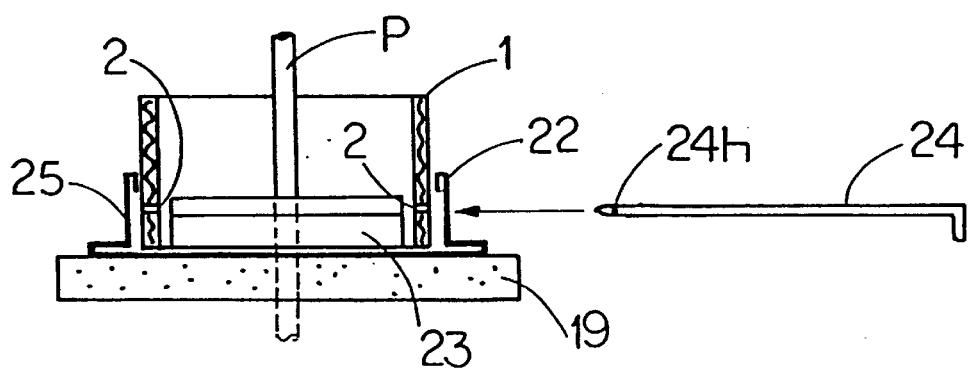
FIG. 17A

BACKFLOW PREVENTION DEVICE ENCLOSURE HAVING IMPROVED ACCESS

This application is a continuation-in-part of U.S. patent application Ser. No. 09/100,032, filed Jun. 19, 1998, which is a continuation-in-part of U.S. patent application Ser. No. 08/820,196, filed Mar. 19, 1997, now U.S. Pat. No. 5,996,611, which is a continuation-in-part of both U.S. patent application Ser. No. 08/743,939, filed Nov. 5, 1996, now U.S. Pat. No. 5,740,832, and U.S. patent application Ser. No. 08/743,940, filed Nov. 5, 1996, now U.S. Pat. No. 5,743,289, the disclosures of which are incorporated by reference in their entirety.

BACKGROUND OF THE INVENTION

The invention relates in general to an apparatus for protecting fluid conveying devices from freezing, tampering, and vandalism. More particularly, the invention relates to a drain door for facilitating the removal of discharged fluid from an apparatus that protects backflow prevention devices and their associated piping. The invention also relates to an improved locking mechanism, heater and a variety of structural enhancements that aide in the construction and installation of the apparatus of the invention. Additionally, the invention relates to a structure that provides for improved access for maintenance and testing of the protected, fluid conveying devices by authorized personnel. Backflow prevention devices are well known and typically include an assembly of one or more check valves installed in a pipeline. These devices prevent the reverse flow, or backflow, of fluid from the downstream pipeline to the upstream supply pipeline or main, which can result when the fluid pressure in the upstream supply pipeline falls below the fluid pressure in the downstream pipeline. The prevention of backflow is particularly important when the downstream pipeline contains contaminated material and the upstream supply pipeline is carrying potable water.

Backflow prevention devices may or may not discharge fluid to the atmosphere. For example, a double check assembly does not discharge fluid. However, when the prevention of backflow is necessitated by health considerations, such as in an installation where contaminated water could be conveyed back into a potable water main, a reduced pressure zone device is included in the assembly. Reduced pressure zone devices discharge a large volume of water when actuated, and thus the downstream water, which may be contaminated, is transferred out of the downstream pipeline to the atmosphere and not back into the upstream supply pipeline. Besides discharging large volumes, these reduced pressure zone devices intermittently discharge small quantities of water. Since these backflow prevention devices are frequently installed in a water supply line outdoors and above ground, it is important that the devices be enclosed and protected from the weather, and particularly from freezing.

It is well known that water lines need to be protected from freezing. Many pipelines are run underground to avoid exposure to ambient temperatures that are below the freezing point of water. Pipelines are also run underground for aesthetic reasons. While a majority of a pipeline may be underground, backflow prevention devices and their associated valving and piping cannot be buried underground because access is needed for proper operation and maintenance of the backflow prevention device. Additionally, discharging backflow prevention devices must be elevated because they must not be submerged in the discharged material. Therefore reduced pressure zone devices cannot be buried in the ground or installed in a floodable pit for the additional reason that they must not be submerged. Thus, in many installations the pipeline is run underground and the portions of the pipeline having backflow prevention devices are constructed above ground level. The backflow prevention devices, valves, and portions of the pipeline are subject to freezing and may become inoperable unless they are protected from the weather.

Years ago, large concrete or cast iron boxes were constructed around backflow prevention devices. A door was provided in the top of the box to provide access to the interior of the box for servicing the device. Open drain holes were formed in the lower portions of the walls of the box to drain any water discharged by the backflow prevention device away from the box. These boxes were inferior due to the material of construction and because access to the interior of the box was difficult. Moreover, due to the open fixed drain holes in these boxes, water, foreign objects and most importantly cold air would enter the interior portion of the box. The movement of cold air into the box defeated a central purpose of its design by facilitating the freezing of the water within backflow prevention device and its associated piping and valving.

U.S. Pat. No. Re 33,523, to Devine, discloses another type of apparatus for protecting a backflow prevention device. This apparatus includes a sectionalized cover which is held together by clamps. The top portion of the cover has openings to permit manipulation of the protruding valve stems which extend above the cover. Drain openings are provided at ground level to permit drainage of liquid from the space within the cover. These drain openings are covered by a screen and vertically cut flaps which hang from the top of the opening to ground level. The cover is insulated and includes an electric heating element placed in the upper portion of the cover interior. Devine does not describe how his apparatus sections are aligned and mounted. Although there are many drawbacks associated with the Devine cover, the openings in the top portion and the flap-covered drain openings allow air to be transferred to and from the interior of the cover, thus significantly increasing the heating requirements of the cover and, in some cases, making freeze protection impractical.

Another type of cover is disclosed in U.S. Pat. No. 4,890,638 (the "'638 patent"), which includes a cover member having a top, which is a unitary structure, and four walls. The '638 patent has drain openings at the bottom portion of its walls to allow water discharged by the backflow prevention device to escape from the interior of the cover. These drain openings are covered by drain doors, which are spring biased to be maintained in a closed position. The '638 patent does not describe a heater or the alignment and mounting structures of the present invention. Additionally, this cover suffers from a variety of drawbacks including the fact that the spring abruptly snaps shut and must be maintained, because it breaks and becomes stretched out after a heavy discharge of fluid through the drain opening.

U.S. Pat. No. 5,609,784 describes an apparatus and method for covering and heating fluid flow devices, which adds a heater positioned on the ground surface in the interior of the cover described in the '638 patent.

The backflow prevention devices enclosed by these structures must be maintained and tested periodically. Ideally, the cover is completely removed to permit unhindered access to the top, front, back, and both sides of the backflow prevention device. A small cover may be separated from its ground anchoring support and removed; however, it is impracticable or, in many cases, impossible for a single person, without mechanical assistance, to completely remove a large cover due to its weight and bulk. Solutions, such as removable doors and hinged panels, have been proposed in the past; these approaches suffer from severely limited access to the backflow prevention device, prohibitive manufacturing cost, and infeasible employment in the field.

In the past, the construction of covers has typically been a metal exterior sheet of approximately 0.050" thick aluminum adhered to an internal rigid insulation such as a polyisocyanurate board, which had to be structurally supported by additional members formed of thicker metal or wood. The outer layer of these known covers provides limited resistance to vandalism, and the inner layer suffers from a lack of reinforcement.

The foregoing demonstrates that there is a need for an energy-efficient enclosure which protects backflow prevention devices, improves drain door operation, improves mounting and alignment of the enclosure, increases the efficiency of the heating operation, facilitates inspection of the backflow prevention device, provides improved access to more sides of the device, includes a better and simpler structural design, and results in improved durability in the working environment.

SUMMARY OF THE INVENTION

The invention satisfies the need and avoids the drawbacks of the prior art by providing an apparatus which efficiently protects a backflow prevention device or any number of fluid conveying or monitoring devices from freezing. The invention provides an insulated enclosure having a self-closing, gravity-biased door that allows for full fluid flow, is maintenance free, tamper resistant, and easy to manufacture. Additionally the hinge employed in connection with this door is disposed on the inside of the enclosure making it less susceptible to vandalism and seizure due to snow and ice. The invention also discloses an improved mounting bracket having risers that extend outside of the enclosure and a rod which extends through openings in the enclosure and mounting bracket. The invention further discloses an improved, secure structure for accessing the upper portion of the enclosure. An alignment guide and integral tabs are also disclosed which facilitate assembly of the enclosure. The invention also describes various heating mechanisms and in one embodiment a sleeve is shown which extends into the slab, through the slab and even extends to the frost line. Further, the invention discloses an enclosure having a shield, which seals and protects one or more fluid conveying devices in the closed position and provides unhindered access to one or more of the devices by authorized personnel in the open position.

BRIEF DESCRIPTION OF THE DRAWINGS

FIGS. 12 and 13 are side views of the lower portion of an enclosure and the slab that the enclosure is resting upon.

FIGS. 12A and 13A are top views of FIGS. 12 and 13 taken along lines 12A—12A and 13A—13A, respectively.

FIG. 17 is a top view of an enclosure and locking mechanism as shown in FIG. 16 with the roof removed from the enclosure.

FIG. 17A is an end view of the enclosure shown in FIG. 17 taken along line 17A—17A and includes a locking rod.

FIG. 18 is a side view of the device illustrated in FIG. 17.

DETAILED DESCRIPTION

Figure 1:
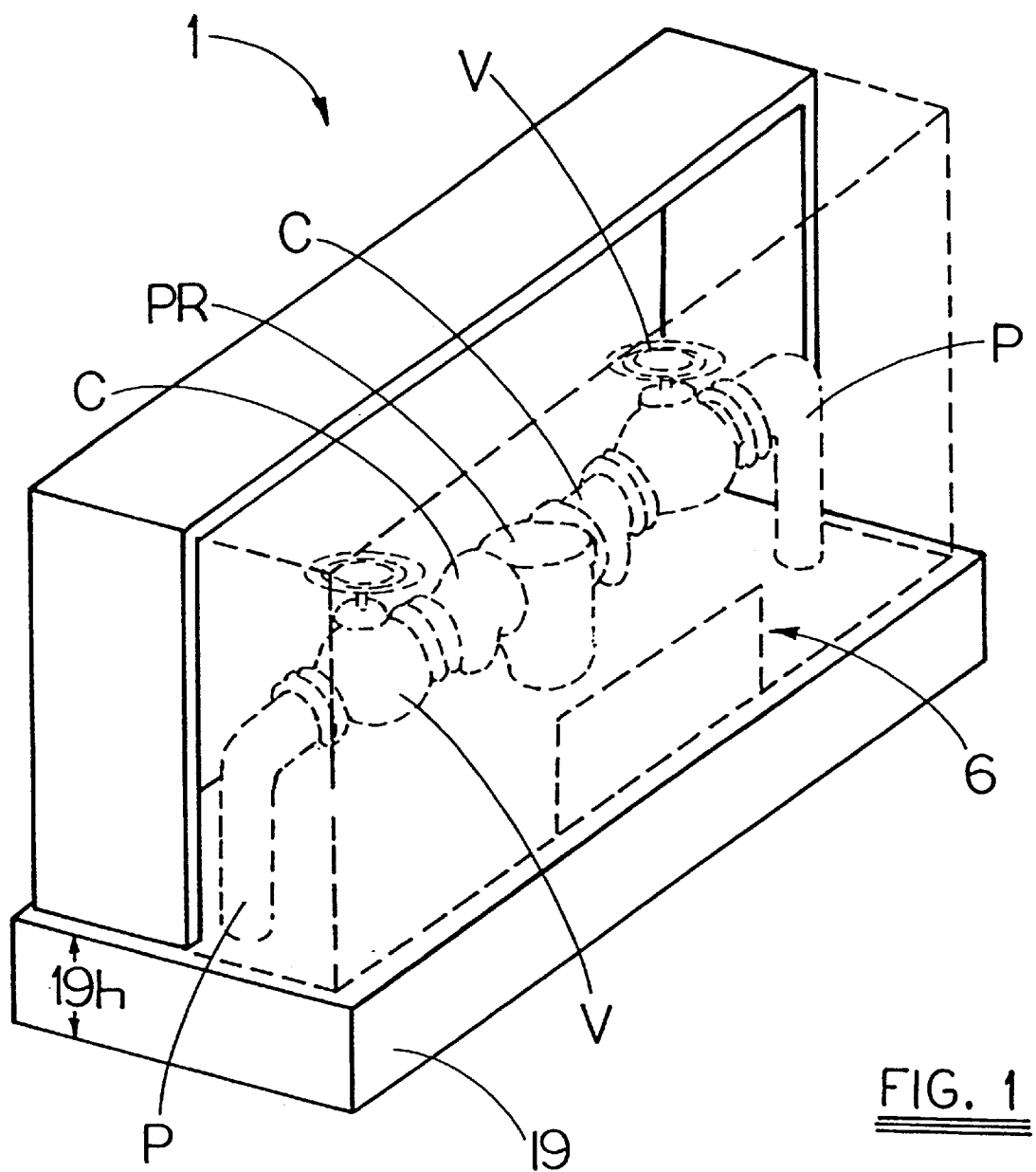
FIG. 1 is a perspective view of an enclosure, shown partially in phantom, enclosing a backflow prevention device and its associated valving and upstream and downstream piping.

FIG. 1 generally illustrates one embodiment of the invention. The enclosure 1, partially shown in phantom, encloses a backflow prevention device, which is depicted in FIG. 1 as two check valves C, a relief valve PR, servicing valves V and inlet and outlet piping P. Although the invention is described for use in connection with a backflow prevention device, the enclosure may be employed to maintain the temperature of material being conveyed through any number of fluid conveying or monitoring devices, such as meters, vacuum breakers, standpipes, pressure regulators, and pumps (referred to generally herein as "fluid conveying devices"). The invention is particularly useful for pipelines carrying water, however its principles may be used for the protection of fluid conveying devices transferring any other material where either the material itself or the fluid conveying device(s) surrounding the material is susceptible to solidification, such as a pressure regulator controlling the flow of natural gas.

The assembly shown in FIG. 1 constitutes a portion of a substantially longer pipeline wherein a majority of the pipeline is installed underground. The backflow prevention device is constructed above the ground to allow for its monitoring and servicing. Additionally, if the device is one that discharges water, enclosure 1 should be equipped with a door 6 and the backflow prevention device must be disposed high enough above ground level to permit the discharge of water to the atmosphere and out door 6 without sub merging the backflow prevention device.

In this embodiment, enclosure 1 is depicted as a rectangular box that may be supported by concrete slab 19. Enclosure 1 may be bolted to concrete slab 19 or attached in any suitable manner known in the art. Concrete slab 19 may go below or rest upon the surface of the ground or pavement and may also be supported upon other surfaces, such as the ground or a slab made of a material other than concrete. Slab 19 may be of various sizes depending on the size of the fluid conveying device and the enclosure 1. While the slab height 19h may be any suitable distance, it may be several feet in some instances so that enclosure 1 may be protected from various dangers, such as automobiles that may drive into and damage enclosures (and fluid conveying devices) that are installed adjacent parking lots and roadways. The slab 19 may be pre-fabricated or it may be poured around piping P.

According to the principles of the invention, enclosure 1 may be of any construction. In one embodiment, enclosure 1 is made of a panel of rigid insulation covered by sheet metal. Enclosure 1 may include access doors to allow for service and monitoring of the fluid conveying devices similar to that described in U.S. Pat. Nos. Re 33,523, 4,890,638 and 5,609,784, the disclosures of which are incorporated by reference herein in their entirety. Access to the fluid conveying device(s) may be had by removing any of the panels such as center panel 1C, by removing the roof 40, by opening a portion of the roof 40B, by removing the entire enclosure (for smaller installations) and by various other mechanisms.

Figure 1A:
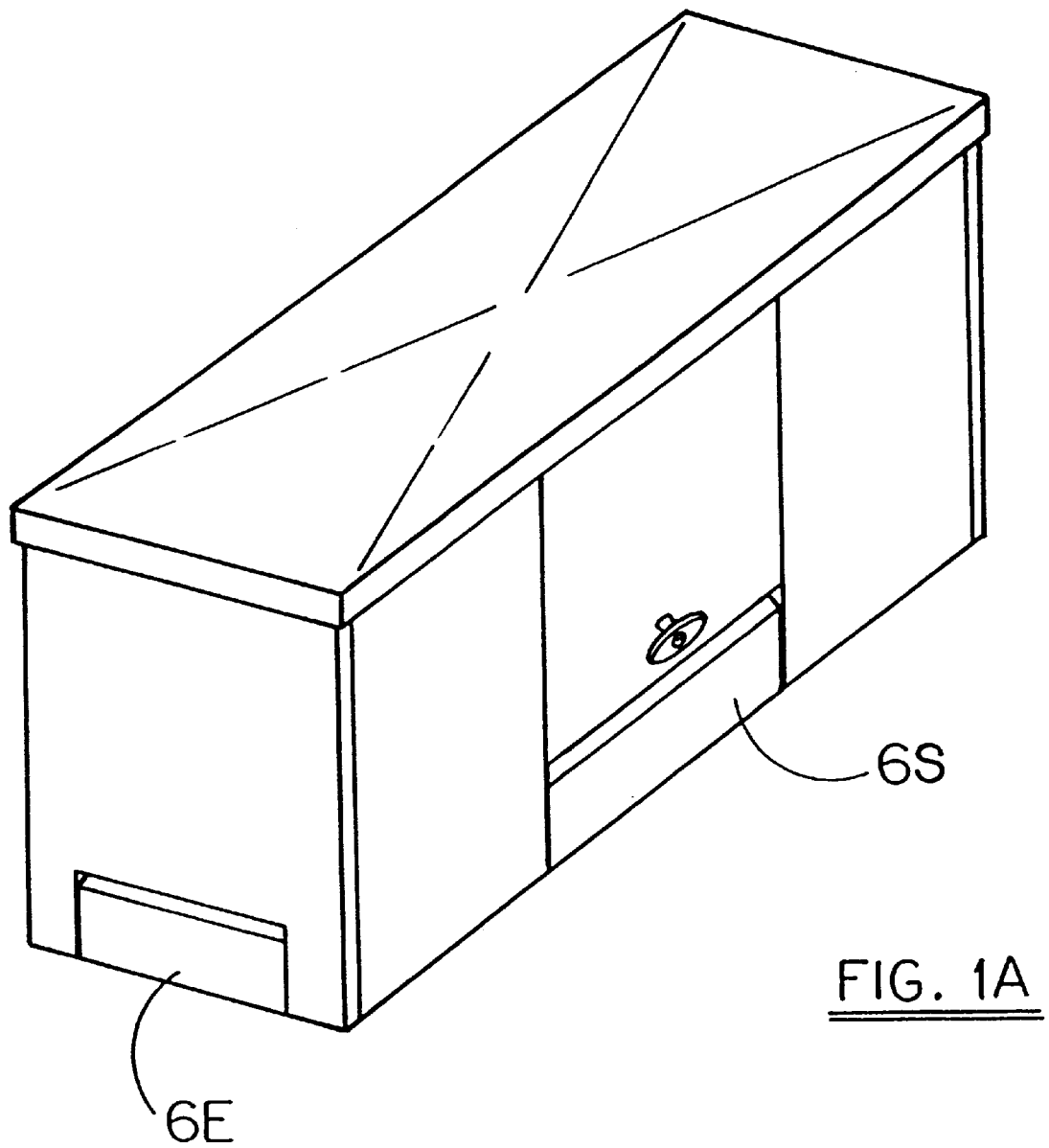
FIG. 1A is another perspective view of an enclosure which identifies a pair of drain doors.

FIG. 1A demonstrates two alternative embodiments of the invention in a single drawing. Side drain door 6S provides one mechanism to allow discharged water to be removed from the enclosure and end drain door 6E provides another. While multiple doors may be employed on the sides or ends of the enclosure 1 in any combination, typically side drain doors 6S are used in enclosures 1 enclosing backflow prevention devices having diameters equal to or greater than three inches and end drain doors 6E are employed in smaller enclosures 1, which enclose devices that are smaller than three inches in diameter such as enclosure 1 illustrated in FIG. 16.

Figure 2A:
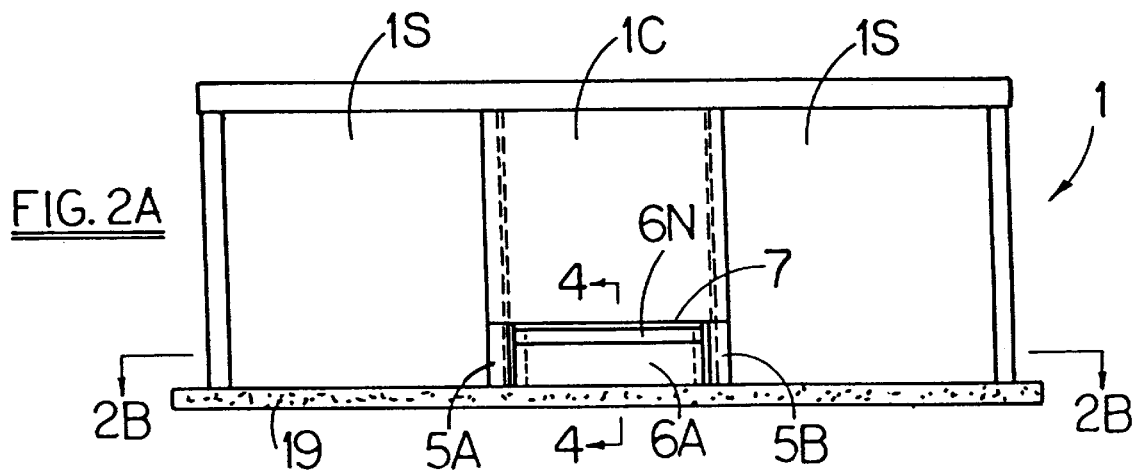
FIG. 2A is a side view of an enclosure constructed according to the principles of the invention illustrating one embodiment of a drain door.
Figure 2B:
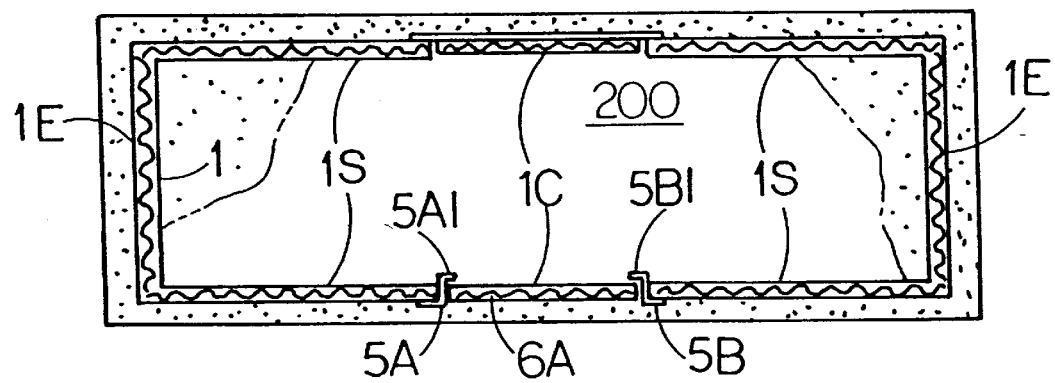
FIG. 2B is a top view of an enclosure taken along line 2B—2B in FIG. 2A.

FIGS. 2A and 2B display side and top views, respectively, of an enclosure 1 having a door 6 located on one side of the enclosure 1. These Figures show door 6 as being insulated in a manner which is substantially similar to end panels 1E, side panels 1S and center panel 1C that define the enclosure 1. Door 6 is illustrated in its normally closed position, which is indicated as closed door 6A. In this embodiment, door 6 is attached to center panel 1C using a continuous hinge 7 or any other device which allows door 6 to be maintained in a normally closed position and permits the door to be opened when fluid needs to be discharged from inside the enclosure 1. A plurality of hinges may be substituted for continuous hinge 7 and the hinge or hinges may be made of any non-rusting material, although stainless steel and thermoplastic materials are preferred. Zees 5A and 5B are attached to the sides and inside flange of center panel 1C. The lower portion of the zees 5A and 5B space door 6 above slab 19 and permit door 6 to freely move outwardly away from the enclosure 1 to enclosure exterior 300 as is more clearly shown in FIG. 4 allowing fluid to be discharged from the enclosure interior 200. The inside portions of the zees 5A and 5B provide stops 5AI and 5BI for the door 6 such that door 6 cannot swing into the enclosure interior 200 due to the force of gravity.

Figure 4:
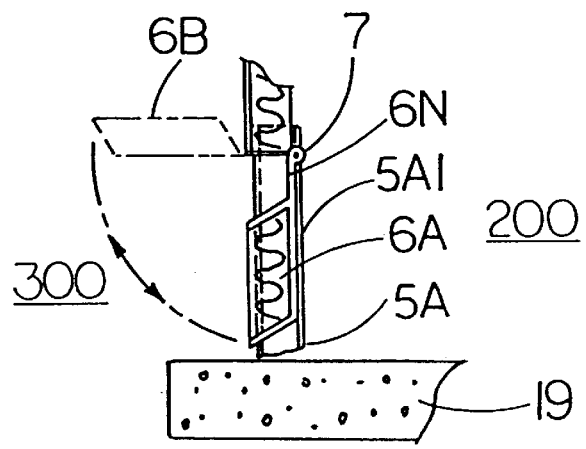
FIG. 4 is an enlarged end view of the drain door demonstrated in FIG. 2A taken along line 4—4.

FIG. 4 is an enlarged sectional view of FIG. 2A illustrating the details of the door of the invention. Door 6A is shown in the closed position against door stop 5AI and is attached to hinge 7. Hinge 7 may be secured to the inside portion of the center panel 1C which may be flush with door stop 5AI and 5BI. The orientation of the hinge 7 mounting relative to the door stops 5AI and 5BI is an important feature of the invention as the positioning of these structures allows the door 6 to be securely biased against the stops 5AI and 5BI by virtue of the effect of gravity. This is due to the fact that the door 6 is designed so that its centroid is located in the enclosure exterior 300 of the enclosure 1. Thus, due to gravity, the door 6 desires to swing inwardly toward the interior 200 of the enclosure. To the extent that the door 6 is securely biased against the stops 5AI and 5BI, the enclosure 1 is more tightly insulated and is therefore more energy efficient. When full flow occurs from the interior 200 of the enclosure to the exterior 300, door 6 pivots from its closed position 6A to a fully open position 6B shown in phantom. As is depicted in FIG. 4, if the insulating materials utilized in door 6 and center panel 1C are incompressible, door 6 may be fabricated with notched portion 6N to enabled the door 6 to reach a fully open position 6B without being blocked by the lower portion of center panel 1C. While the notched portion 6N of the door 6 has some drawbacks due to the lack of insulating materials along this portion of the door 6, it has the advantage of allowing unobstructed fluid flow through the discharge opening and the assurance that the door is securely closed against the stops 5AI and 5BI when the flow has subsided. Of course, if compressible insulation is employed in the lower portion of center panel 1C and/or the upper portion of door 6, then the size of the notched portion 6N may be minimized or eliminated.

Figure 3A:
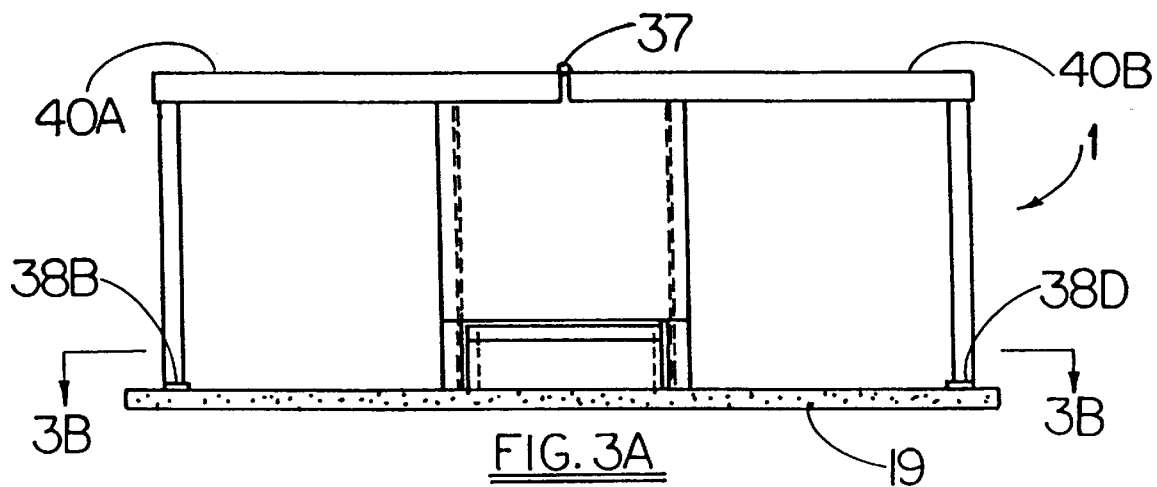
FIG. 3A is a side view of another enclosure constructed according to the principles of the invention illustrating one embodiment of an enclosure roof.
Figure 3B:
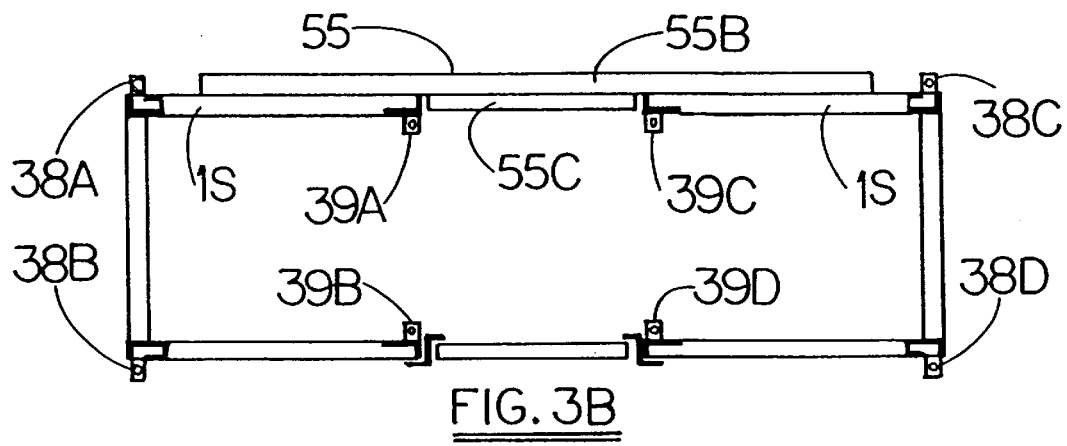
FIG. 3B is a top view of an enclosure taken along line 3B—3B in FIG. 3A.
Figure 5:
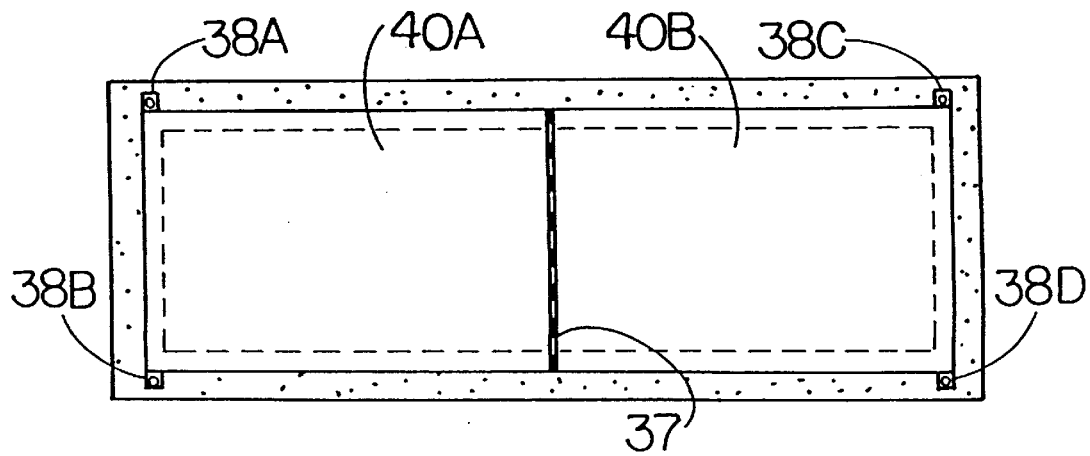
FIG. 5 is a top view of the enclosure depicted in FIG. 3A.
Figure 6A:
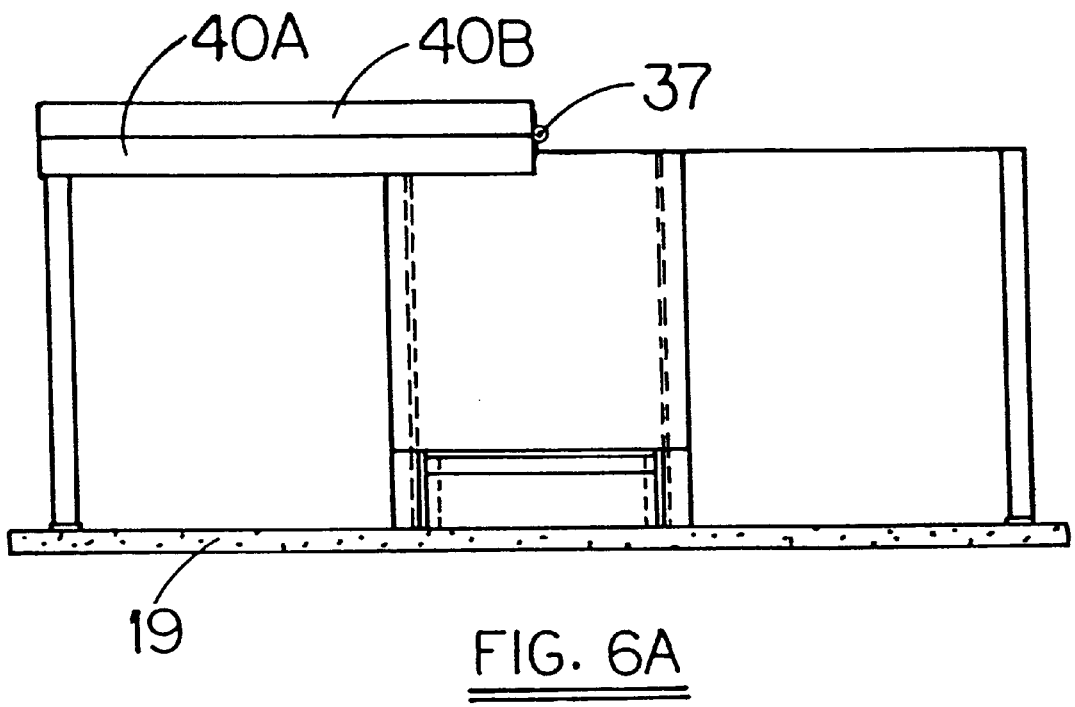
FIGS. 6A and 6B are similar to FIGS. 3A and 5 showing the roof in a partially open position.
Figure 6B:
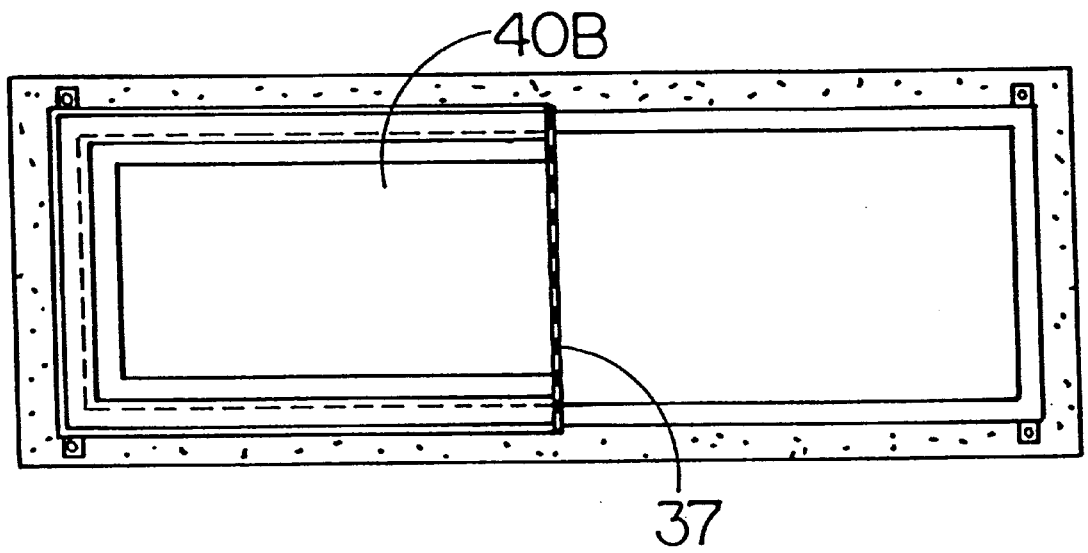
Figure 6C:
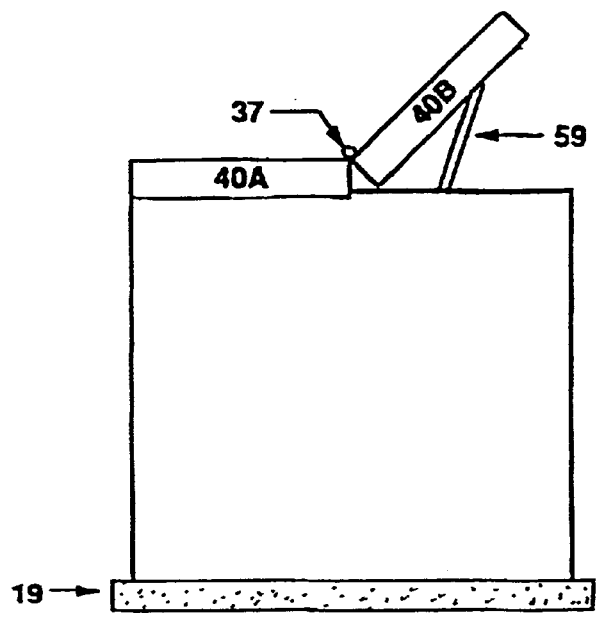
FIGS. 6C and 6D are views of various roofs for enclosures constructed according to the principles of the invention.
Figure 6D:
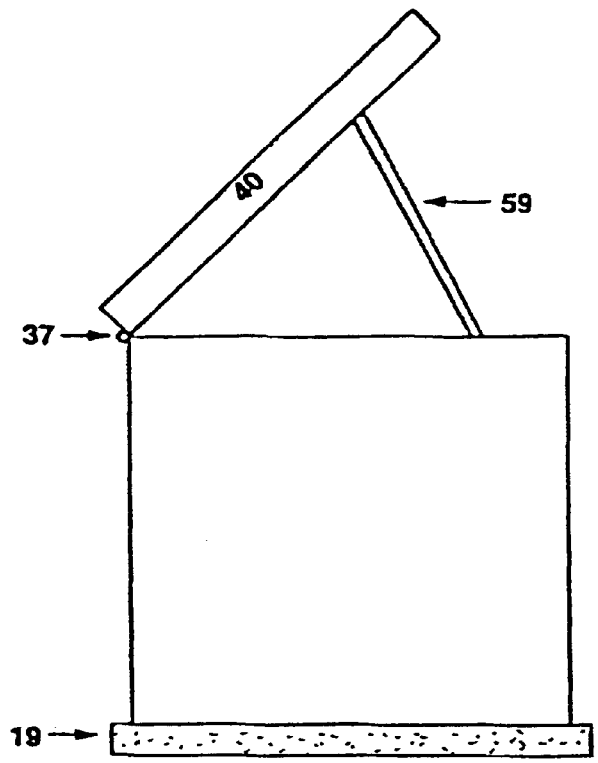

FIGS. 3A, 3B and 5 show another embodiment of the invention and are directed to alternative advantageous features which may be employed in a backflow prevention device enclosure 1. FIG. 3A shows an enclosure 1 which may be mounted on slab 19. The roof 40 of the enclosure 1 is depicted as being divided into two separate portions 40A and 40B which are attached together via a hinge 37. The roof 40 may be hinged in different places resulting in a variety of differently sized portions 40A and 40B. Access to differing parts of various backflow prevention devices and the overall weight of the roof 40 are factors considered in determining the number and size of the roof portions. FIGS. 6A and 6B are similar to FIGS. 3A and 5 with the exception that the roof 40 is shown in the open position. Notably, roof portion 40B is not propped in the air, but rests on roof portion 40A which provides an important safety advantage. When the size of the roof 40 permits, the roof or roof portions may be restrained in various open positions. For example, FIGS. 6C and 6D depict roof portion 40B and roof 40 in open positions, respectively. Any suitable restraining mechanism 59 having the capability of maintaining the roof or roof portions in various open positions may be used. A spring hatch holder, Model # mm115 SS, available from Austin Hardware Co., Duluth, Ga.; a door prop, Model # 6228, available from Austin Hardware Co., Duluth, Georgia; and a gas spring, Models # EAA-8350-U, EAA-8500-U, EAA-8600-U, available from Eberhard Manufacturing Co., Cleveland, Ohio have been found to be useful restraining mechanisms for roof and roof portions of this invention. The roof design illustrated in FIGS. 3A, 3B, 5, 6A, 6B, 6C and 6D was developed specifically to enclose and protect a fluid conveying device where it was desirous to service the back flow prevention device from above without removing either the entire roof or a wall of the enclosure 1.

FIGS. 3A, 3B and 5 demonstrate structurally integrated mounting tabs 38A–D and 39A–D which may be employed to attach enclosure 1 to slab 19. In a preferred embodiment, these tabs 38A–D and 39A–D are integrally fabricated as part of enclosure 1 which provides added strength and eliminates the need for an installer to mate separate tabs to the enclosure 1 before affixing the enclosure to slab 19. FIGS. 12, 12A, 13 and 13A illustrate, in greater detail, structurally integrated mounting tabs 3 8A and 3 9A which are depicted as being integral with side panel 1S (partially shown). Screws 38S and 39S affix side panel 1S to slab 19 and pass through tabs 38A and 39A. When an installer has a panel in place, for example side panel 1S, the panel can be immediately attached to slab 19 without first having to find and attach a distinct tab to the enclosure 1. FIGS. 12A and 13A show top views of side panel 1S.

FIG. 3B depicts alignment guide 55 which is another feature of the invention. During assembly, the alignment guide 55 may be placed along one or both sides of enclosure 1 adjacent to side panels 1S and center panel IC. The alignment guide 55 may be utilized to ensure that the center panel 1C and side panels 1S are properly aligned prior to attaching the enclosure 1 to slab 19. FIGS. 11, 11A, 11B and 11C provide further detail to the alignment guide 55. When the alignment guide 55 is in position, horizontal leg 55B will rest on slab 19. Vertical leg 55A may be held flush against side panels 1S so that the panels can be properly aligned. The second horizontal surface is identified as horizontal center leg 55C. Horizontal center leg 55C extends into the opening that exists between the side panels 1S and may be designed to be nominally the same width as center panel 1C, thus the side panels 1S are installed at a distance such that center panel 1C may be installed there between. The method for aligning the side panels 1S may be accomplished by first placing the alignment guide 55 on its horizontal leg 55B in the proper position on slab 19. Next, side panels 1S are placed against vertical leg 55A and horizontal center leg 55C as is generally shown in FIG. 3B. After the side panels 1S are properly aligned they are fixed to slab 19 and the alignment guide 55 may be discarded.

Figure 7:
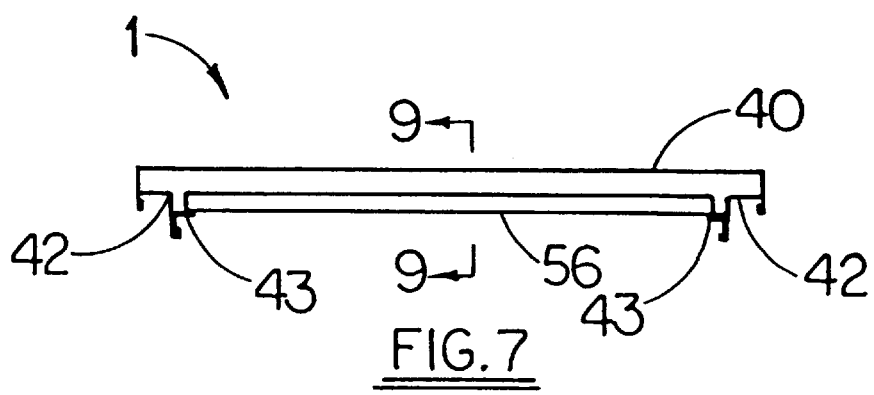
FIGS. 7, 8 and 9 illustrate various views of the roof of the enclosure constructed according to the principles of the invention.

FIG. 7 illustrates the roof 40 in greater detail from one end of the enclosure 1. The outer portion of the roof 40 is shown locked to pocket channel 42 and the pocket channel 42 is shown locked to insulation retaining angle 43. A structural channel 56 is depicted traversing from one side of the enclosure 1 to the other and may be attached at either end to insulation retaining angles 43. The structural channel 56 may be employed to enhance the structural integrity of the enclosure 1 and to further strengthen the structure, particularly when the roof 40 of the enclosure 1 is not attached to the panels of the enclosure 1.

Figure 8:
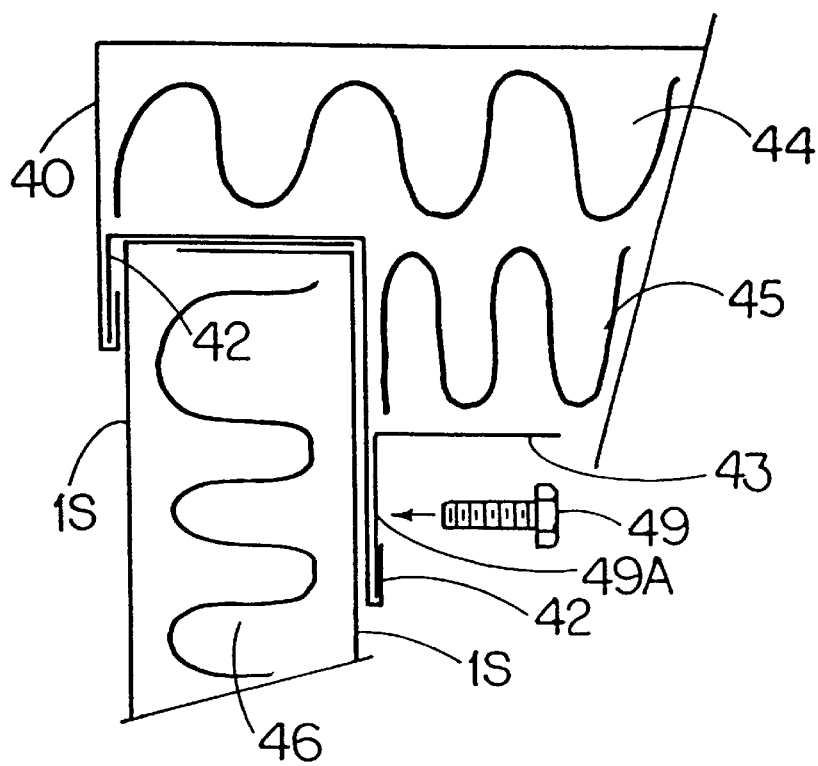

FIG. 8 is related to FIG. 7 and details the engagement of the roof 40 with a side panel 1S. As is shown in FIG. 7, roof 40 is locked to pocket channel 42 which is locked to insulation retaining angle 43. When the side panel 1S and roof 40 are in place a self tapping machine screw 49 or any other suitable attaching device may be inserted through hole 49A to fix the side panel 1S to the pocket channel 42 and insulation retaining angle 43. The roof 40 and side panel 1S include insulating panels 44/45 and 46, respectively.

Figure 9:
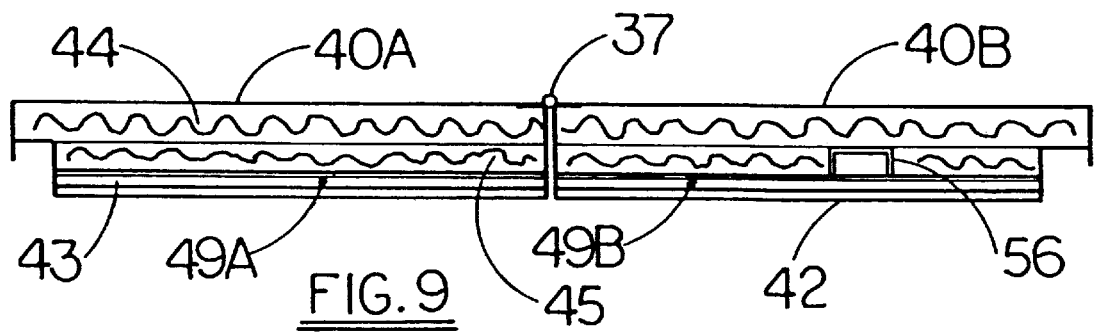
Figure 11:
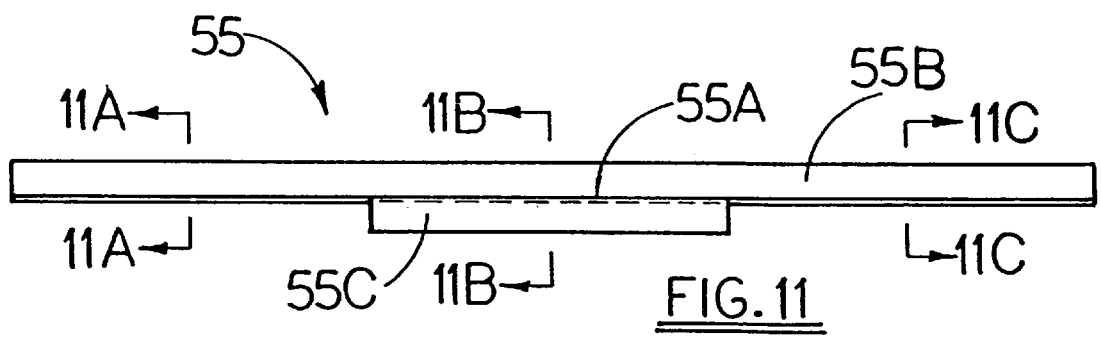
FIG. 11 provides a top view of the alignment guide constructed according to the principles of the invention.
Figure 11A:
FIGS. 11A, 11B and 11C are end views of the alignment guide depicted in FIG. 11 taken along lines 11A—11A, 11B—11B, 11C—11C, respectively.
Figure 11B:
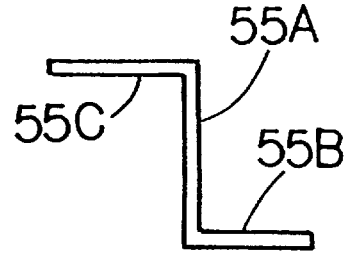
Figure 11C:
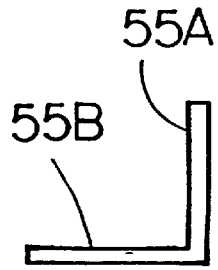

FIG. 9 is a sectional view of FIG. 7 taken along line 9—9, which is similar to the upper portion of the side view shown in FIG. 3A. Roof portions 40A and 40B are shown in the closed position and are attached by hinge 37. Structural channel 56 is illustrated from one end inserted between the insulating panels 44 and 45. Pocket channel 42, insulation retaining angle 43 and holes 49A and 49B, described above, are also identified in FIG. 9.

Figure 10A:
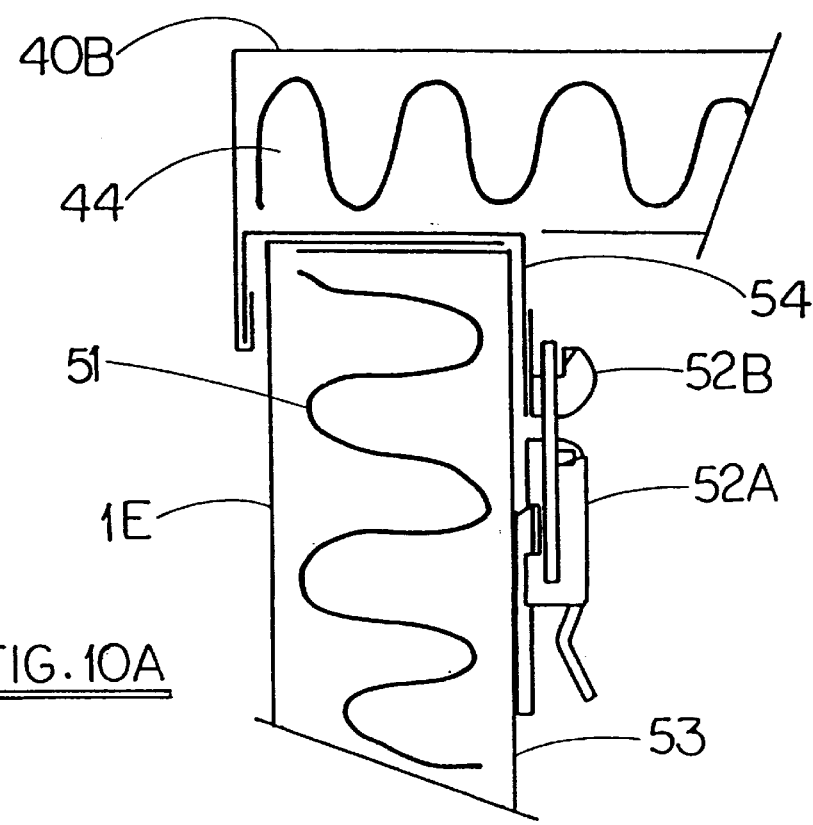
FIGS. 10A and 10B demonstrate one manner of closing and latching, from the interior of the enclosure, the roof portion.
Figure 10B:
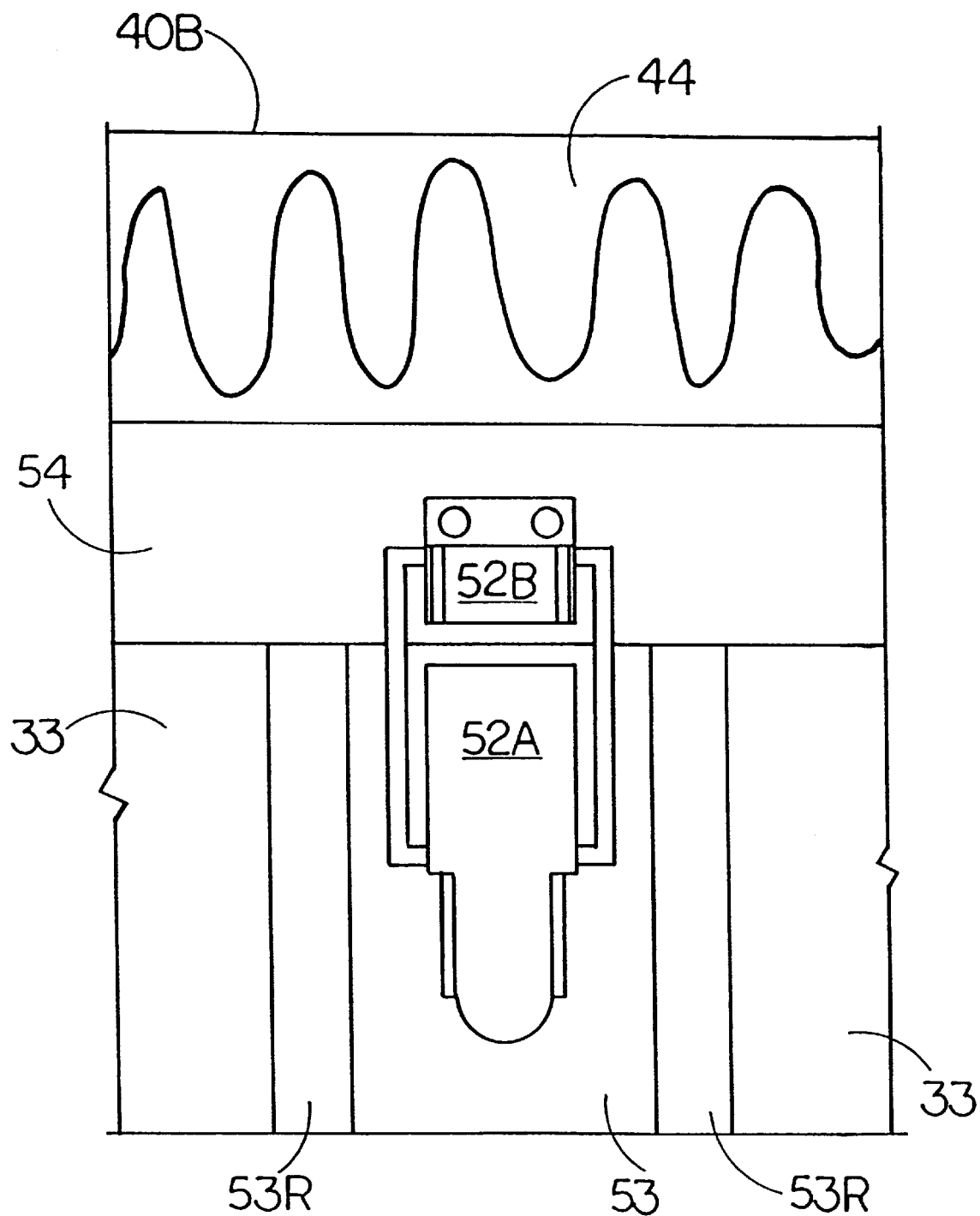

FIGS. 10A and 10B illustrate further embodiments relating to an enclosure 1 having roof portions 40A and 40B as was generally shown in FIGS. 3A and 6A. In use, the enclosure depicted in FIGS. 3A and 6A would have the roof portion 40B in the closed position and engaged with vertical insulation retainer 53. Vertical insulation retainer 53 has two bent sides 53R which stiffen and strengthen the retainer 53 and hold insulating panel 51 of end panel 1E in place. Insulating panel 51 is shown having an exposed reflective surface 33. For security purposes, roof portion 40B may be latched closed with the latch mechanism 52A and 52B which is positioned inside the enclosure 1. Therefore, the roof portion 40B may be pivoted upward only after opening the latch mechanism from within the enclosure 1. Thus, only a person with a key to the lock on the door to the enclosure 1 may gain access to the enclosure 1 through roof 40. Any suitable latching mechanism 52 having the capability of maintaining the roof 40 in a closed position may be used. A preferred latch, Drawer-Tite Action Catch, Model #M10-8333, available from Component Hardware Co., 1890 Swarthmore Avenue, Lakewood, N.J. 08701, has been found to be a useful device for latching the roof 40 to the enclosure 1.

If ambient conditions are such that freezing may occur, then power may be delivered to the area enclosed by the enclosure 1 to maintain the temperature above a setpoint controlled by a controller, such as a thermostat. Power may be delivered via electrical current (alternating or direct), solar power, geothermal power, wind power, and the like. For example, FIGS. 14 and 15 generally demonstrate mechanisms to maintain the temperature within the enclosure above the freezing point of the fluid being conveyed through the piping P and the fluid conveying device FCD. Enclosure 1 may be placed upon slab 19 which may be fabricated at the surface or ground level S above gravel G. Gravel G may be replaced by heat transfer media having an enhanced heat storage capability to establish a heat sink having a greater thermal efficiency. For example, refractory materials may be employed such as magnesite brick, which has a specific heat of 0.27 Btu/lb/degree F. and a density of 170 lb/cu. ft. resulting in a heat capacity that is approximately 50% greater than that of concrete. Other heat storage media, for example those having change of phase characteristics, such as media that release energy based on the heat of fusion, heat of sublimation, heat of vaporization or other latent heat releases are contemplated as useful sources of heat to maintain the temperature in the enclosure of this invention. The frost line F is also shown in FIG. 15.

Figure 14:
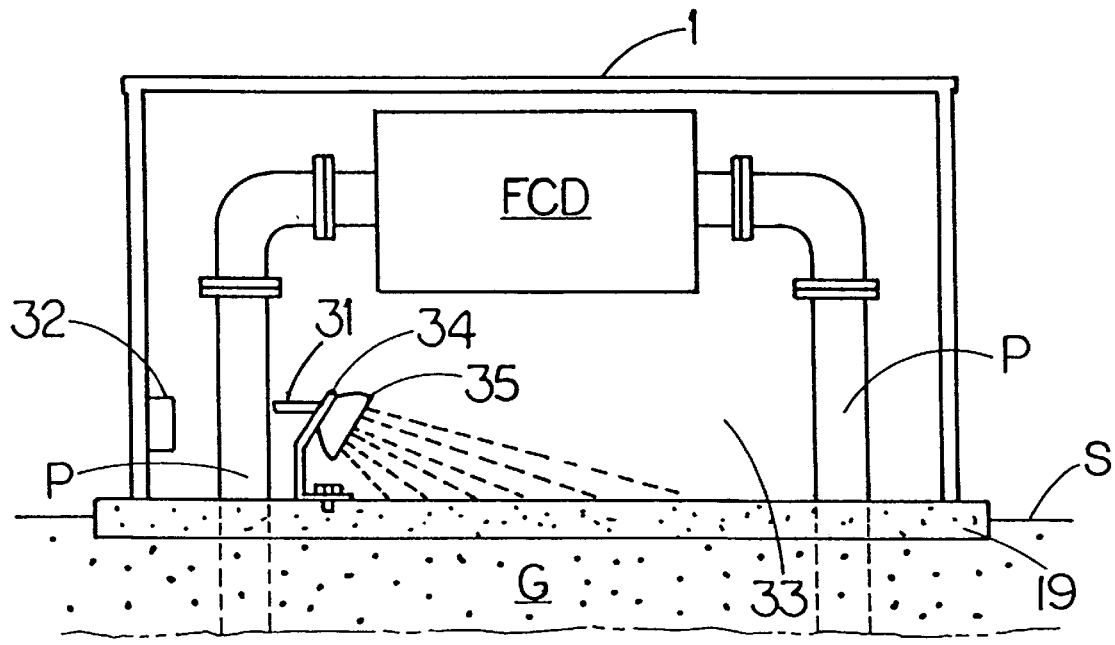
FIG. 14 is a side view of an enclosure having a heating unit constructed according to the principles of the invention.

In FIG. 14 the source of heat is radiant heater 35 which may be held in place by holder 34 to direct infrared radiation toward the slab 19. Radiant heater 35 may be mounted anywhere on the interior walls or roof of the enclosure 1, the fluid conveying device FCD or piping P but should not be placed in contact with the slab 19. Radiant absorptivity is a measure of the total absorptive power of a real surface to that of a black body surface at the same temperature where the black body is 1.0. The radiant absorptivity of concrete and iron is about 0.9 compared to about 0.04 for aluminum. Thus, if the slab 19 is made of concrete and the fluid conveying device FCD is made of iron, a majority of the radiation will be absorbed into the slab and fluid conveying device. The small amount of radiation that is reflected from slab and fluid conveying device will be reflected back toward the slab 19 and fluid conveying device FCD from reflected surface 33, which is advantageously a reflective material such as aluminum foil. The air within the enclosure 1 becomes heated by convection from heated slab 19 and fluid conveying device FCD. Since warmer air rises, lower placement of the heating mechanism provides less thermal stratification and thus greater energy efficiency. A built-in thermostat 31 may be used to control radiant heater 35. An optional thermostat 32 may be utilized as a temperature sensing device to provide further or alternative control of heater 35. The reflective surface 33 is designed to cover the inside surfaces of the enclosure 1 and may be employed to direct radiant heat toward the fluid conveying device FCD and slab 19. Because the radiant heater 35 is held above the slab 19, it is out of the fluid discharge and drip zone of the fluid conveying device(s), thus it is easier to maintain. If the thermostat 31 is mounted to the radiant heater 35, then only a single run of conduit and wire need be employed to power the heating mechanism.

Figure 15:
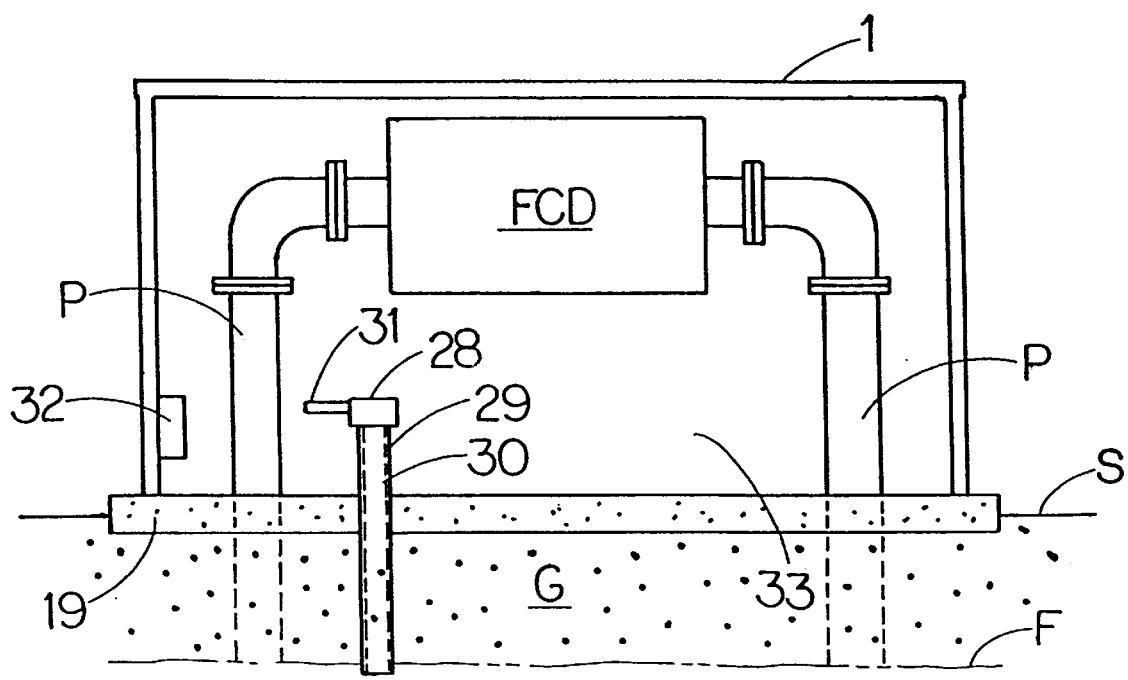
FIG. 15 is a side view of an enclosure having another heating unit constructed according to the principles of the invention.

An alternative heating mechanism is depicted in FIG. 15. Before slab 19 is installed, a heater sleeve 29 may be oriented adjacent piping P. The heater sleeve 29 may extend below the position that slab 19 will eventually occupy and may further extend into gravel G or even below gravel G. Although not shown, heater sleeve 29 may extend into a naturally occurring or man-made void disposed below slab 19. Moreover, heater sleeve 29 may extend to a location which is equal to or below the frost line F. Heater sleeve 29 may be a conventional pipe or any other structural suitable for conducting heat and encasing a heater. At the top of heater sleeve 29 a housing 28 may be installed. Housing 28 is preferably liquid tight so that heater 30, which may be installed within heater sleeve 29, is protected from fluid which may leak or be discharged from fluid conveying device FCD. As stated above, gravel G may be replaced with a void or materials having a high heat storage capacity. As in FIG. 14, thermostats 31 and 32 and reflective surface 33 may be included in the apparatus depicted in FIG. 15.

Any suitable water-tight heater having the capability of maintaining the fluid conveying device and the material therein at a temperature high enough to avoid freezing the material and the fluid conveying device may be used. A preferred radiant heater 35, liquid tight heater U-RAD-3LT, manufactured by Chromalox, 641 Alpha Drive, Pittsburg, Pa. 15238, has been found to be a useful device for maintaining the temperature within the enclosure 1 in the embodiment illustrated in FIG. 14. A preferred heater 30, liquid tight heater type MTO-LT also manufactured by Chromalox has been found to be a useful heater in the embodiment depicted in FIG. 15. While any number of thermostats may be employed according to the principles of this invention, cartridge & hex head immersion Type 17000 and coupling head immersion type 18000, also manufactured by Chromalox, have been found to be useful thermal monitoring devices.

Figure 16:
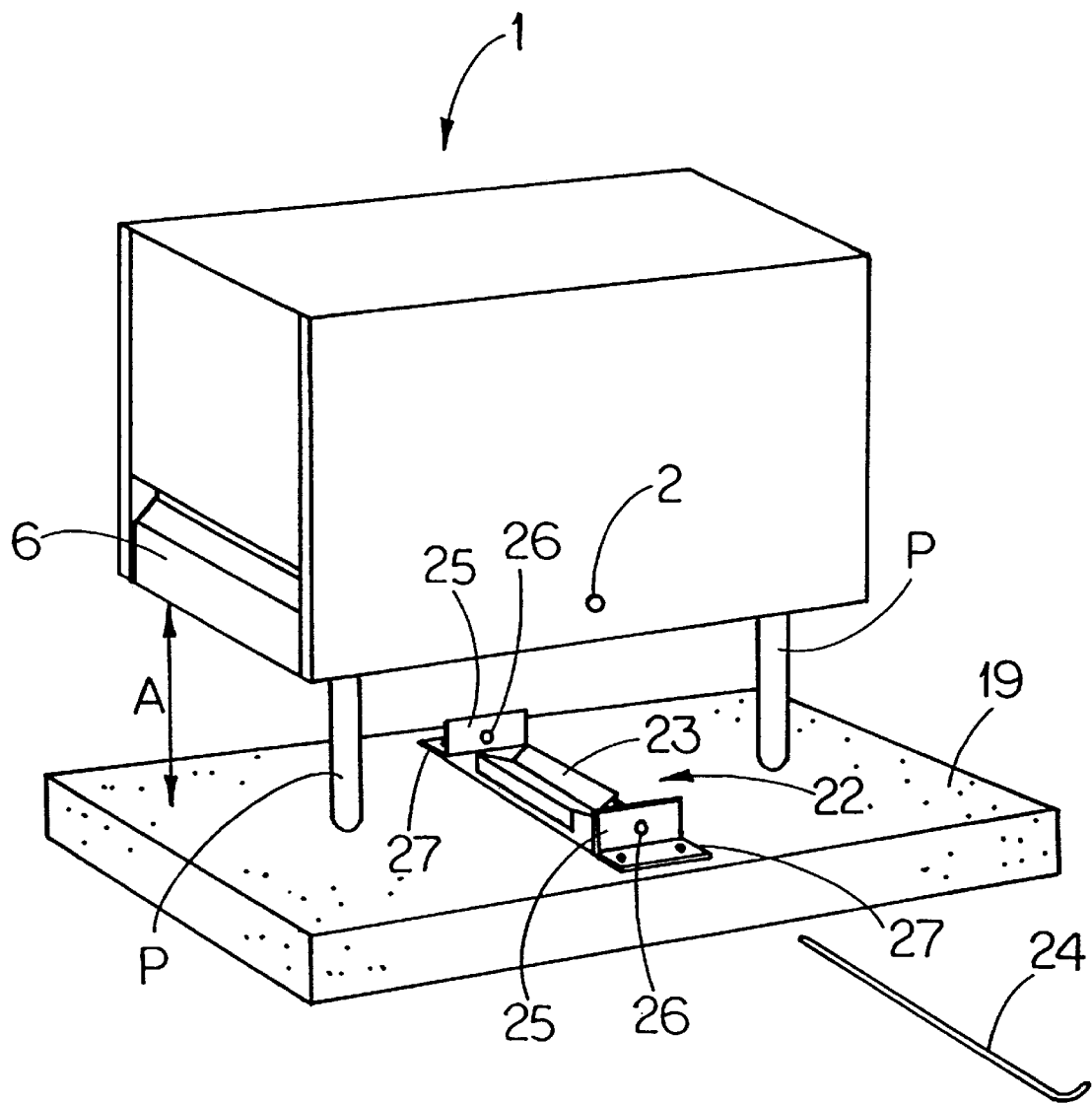
FIG. 16 is a perspective view of an enclosure and locking mechanism constructed according to the principles of the invention.

FIGS. 16, 17, 17A, 17B, 18 and 19 illustrate other embodiments of the invention. FIG. 16 is a perspective view of an enclosure 1, including a door 6, that may be lifted as shown by arrow A and placed over a fluid conveying device and piping P. Although the functions are the same, enclosure 1 illustrated in FIG. 16 is a unitary structure which is distinct from the enclosure 1 shown in FIG. 1A which is made from a plurality of panels. A mounting bracket 22 is shown that may rest upon the upper surface of slab 19 or any other suitable surface. In this embodiment mounting bracket 22 is attached to slab 19 through the use of concrete fasteners (not shown) inserted through concrete fastening holes 27. After the mounting bracket 22 is fixed in place and the enclosure 1 is set on the mounting bracket 22, locking rod 24 may be employed then to hold enclosure 1 in place. Locking rod 24 may be inserted through hole 26 in riser portion 25, next through hole 2 in enclosure 1, next over trough 23, next through hole 2 in enclosure 1 (not shown), and finally through hole 26 in riser portion 25. Locking rod 24 may be made of stainless steel and may have a beveled end to facilitate the ease of sliding the locking rod 24 through the plurality of holes required to mount enclosure 1 to slab 19. A hole 24h may be placed adjacent the end of the locking rod 24 in which a suitably sized padlock may be employed that cannot be pulled through hole 26 in riser portion 25. This provides security for the fluid conveying devices within the enclosure 1.

Figure 19:
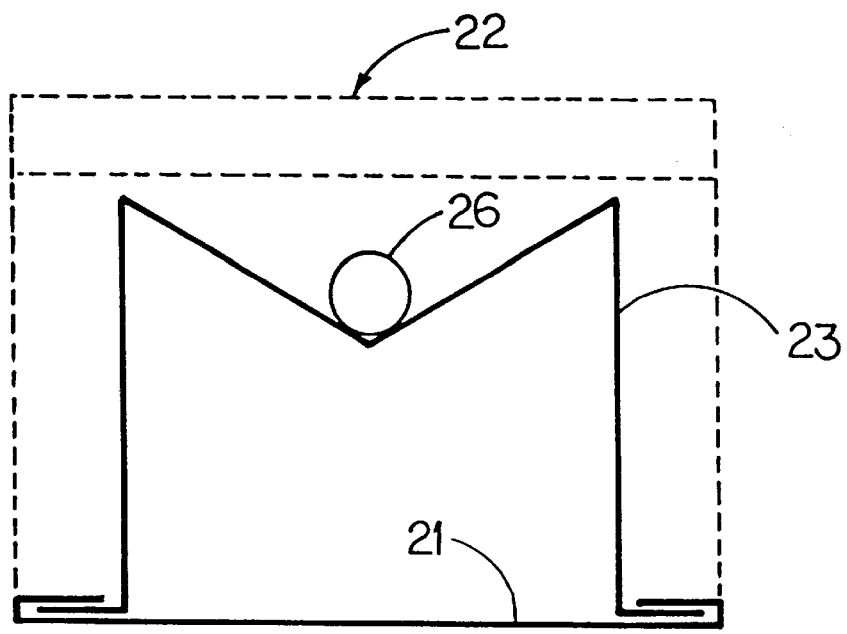
FIG. 19 is a side view of the device illustrated in FIG. 17B.
Figure 17B:
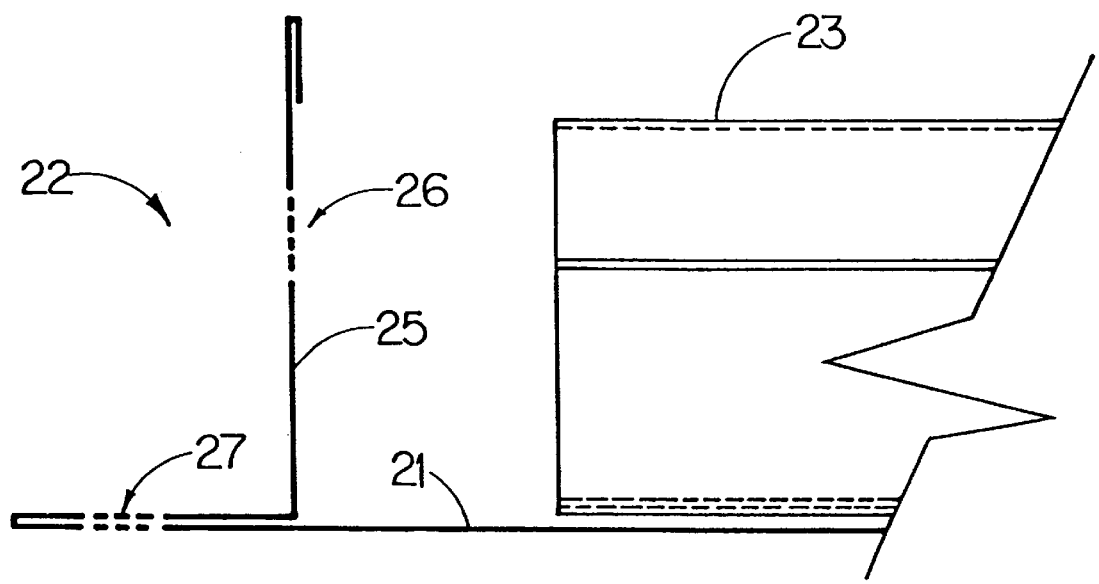
FIG. 17B is an enlarged view of the locking mechanism shown in FIG. 17A.

FIGS. 17, 17A and 18 display enclosure 1 with the upper portion of its panels and roof cut off. FIGS. 17 and 17A illustrate the fixed engagement of the mounting bracket 22 with the slab 19 and the releasably engageable relationship between enclosure 1 and mounting bracket 22. Because riser portions 25 are positioned outside of the exterior of enclosure 1 the alignment of holes 2 with holes 26 can be easily accomplished prior to insertion of the locking rod 24. Enlarged views of mounting bracket 22 are shown in FIGS. 17B and 19. FIG. 19 demonstrates one manner in which trough 23 may be fixed to the base 21 of the mounting bracket 22.

The method of installing mounting bracket 22 to slab 19 is as follows. First, mounting bracket 22 is centered between the inlet piping P and outlet piping P. Then the enclosure 1 is set over the fluid conveying device and into the mounting bracket 22 to ensure correct alignment and clearance around the fluid conveying device. The locking rod 24 is then inserted through holes 2 and holes 26 in the enclosure 1 and mounting bracket 22, respectively. Concrete fasteners are installed in the slab 19 by insertion through concrete fastening holes 27. Now that the mounting bracket is secured to the slab 19, the enclosure 1 may be lifted off and replaced as necessary.

FIGS. 20–24 illustrate another embodiment of the invention, which is indicated as enclosure 60. Shield 61 is shown in a closed position resting on support 62 in FIGS. 20 and 22 and is shown in an open position resting on back 63 in FIGS. 21 and 23. Open and closed positions may be achieved by rotating shield 61 about hinge points 64. Pins or rods may be inserted at hinge points 64 into back 63 or, alternatively, may be inserted into support 62 or, alternatively, could travel through both support 62 and back 63. A single pin or rod may be employed that extends between the hinge points 64. Any device or mechanism allowing rotation of the shield 61 is contemplated by the invention as being employed at hinge points 64.

The height of support 62 is illustrated as being less than half of the height of the fluid conveying device FCD and increases in height from the front to the back of enclosure 60. Of course, support 62 may also have a constant height. However, in any event, support 62 must mate with shield 61 when shield 61 is in a closed position. The height of the support 62 may range from a minimal height, such as an inch or so, and may be as high as the height of the highest point of the fluid conveying device FCD. It is understood that the shorter the height of the support 62 the greater the access to the fluid conveying device FCD when shield 61 is in an open position. However, it is also understood that as the height of the support 62 decreases the structural integrity of enclosure 60 is reduced. Of course, the location of hinge points 64 would necessarily move depending on the size and configuration of support 62, back 63, and shield 61. The mating surfaces of shield 61, support 62, and back 63 may be of other geometries than those illustrated, as long as they mate when shield 61 is in a closed position.

The top of shield 61 is depicted as being sloped, relative to the ground surface, toward both the front and back of enclosure 60 to facilitate the prevention of any accumulation of snow, rain or debris. It is contemplated that the top may be of any suitable geometry and may be smooth, corrugated, or include break lines or any other of a variety of surface characteristics which provide structural integrity, reduce weight, and assist in the removal of snow, rain or debris. In a preferred embodiment, shield 61 has a vertical back portion 61$b$, a vertical front portion 61$f$, and vertical side portions 61$s$, which permit substantial access to the one or more of the fluid conveying devices protected by the enclosure 60. Additionally, this illustrated construction minimizes the cost and weight of enclosure 60 as shield 61 requires less material and labor than prior enclosures having top and side walls.

Figure 21:
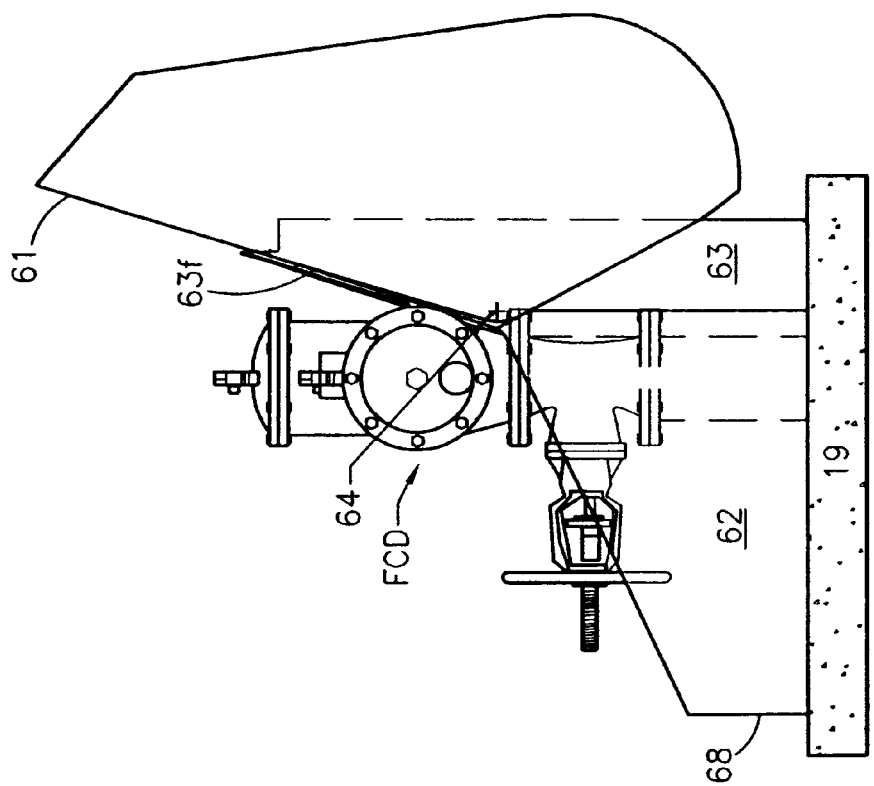
FIG. 21 is similar to FIG. 20 showing the shield in an open position.
Figure 20:
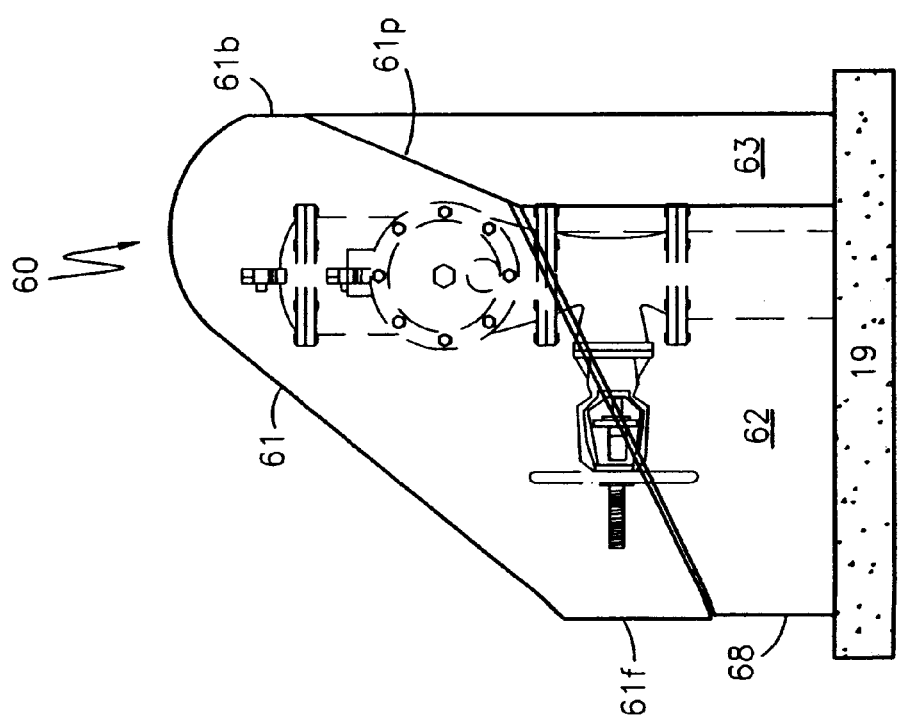
FIG. 20 is an end elevational view of an enclosure with a shield in a closed position constructed according to the principles of the invention.
Figure 23:
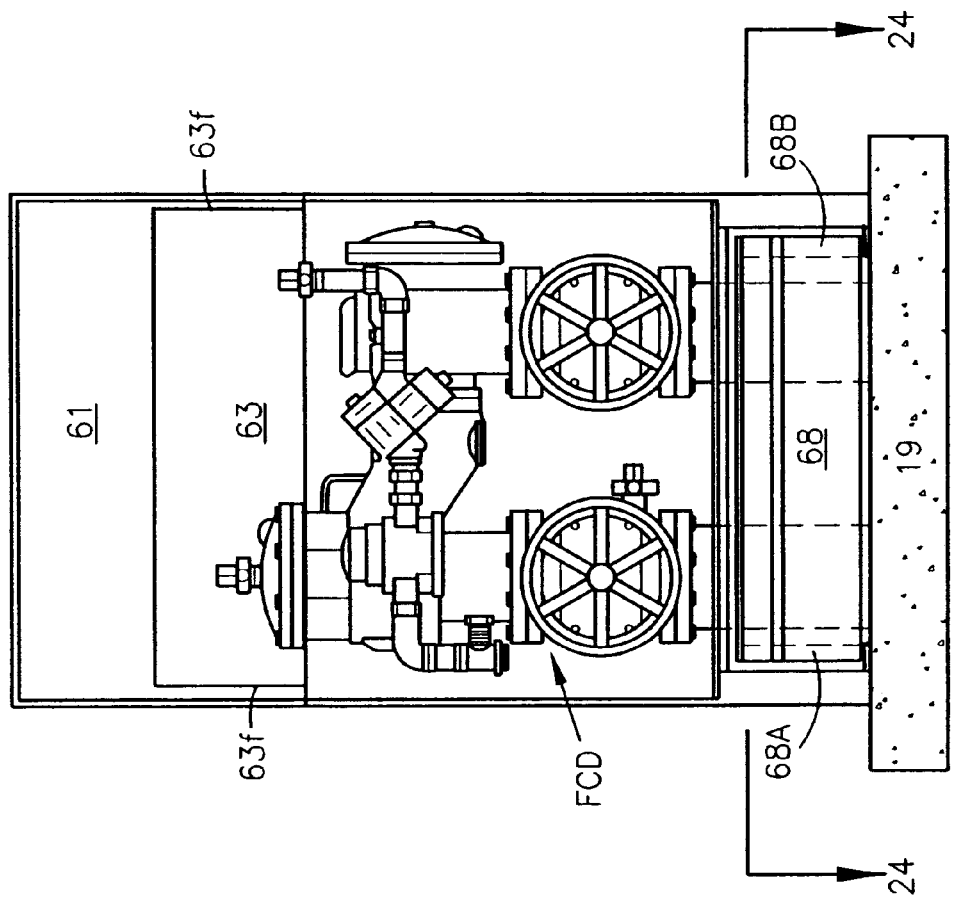
FIG. 23 is similar to FIG. 22 showing the shield in an open position.

Back 63 and support 62 constitute the lower portion of enclosure 60. As shown in FIGS. 21 and 23, the width of back 63 may be somewhat less than the width of shield 61 to permit shield 61 to be rotated past back 63. In a preferred embodiment, back 63 includes a pair of flanges 63$f$ that together with a strip of sealing material (not shown) engage back sloped portion 61$p$ of shield 61 to form a seal when shield 61 is in a closed position.

Figure 24:
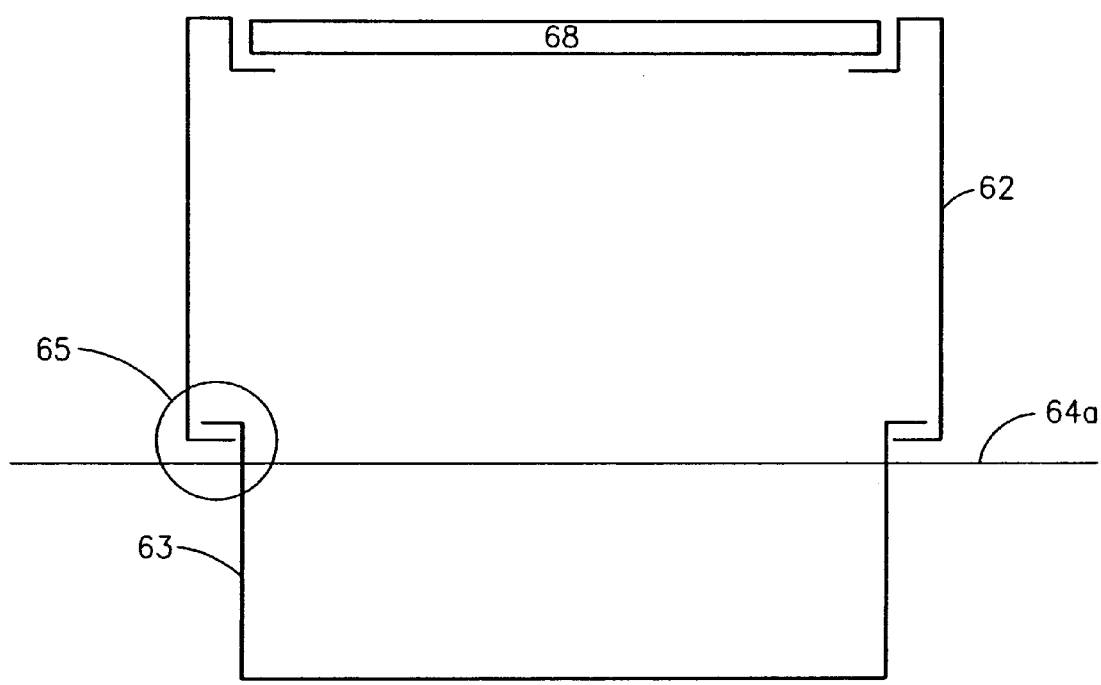
FIG. 24 is a top view of the enclosure depicted in FIG. 23 taken along line 24—24 with the concrete slab removed.

As shown in FIG. 24, a structural zee-shaped column 65 may be formed at the junction of support 62 and back 63 to provide vertical support for hinge point 64, which supports the entire weight of shield 61 when shield 61 is rotated between open and closed positions. Centerline 64$a$ indicates the centerline of the hinge points 64, which are illustrated as being on either side of back 63. In addition to the relative vertical location of hinge points 64 described above, hinge points 64 may be disposed within a range of horizontal positions between the front and back of enclosure 60. For example and in connection with FIG. 24, the depth of back 63 may be increased and the depth of support 62 reduced by the same amount, which would reduce access to the fluid conveying device FCD but would make shield 61 easier to open since the centroid of shield 61 would be relatively closer to the hinge point. It is understood that the relative positioning of the hinge points 64 to the centroid of shield 61 affects the ease of opening and closing, as well as the amount of access available to one maintaining the fluid conveying device FCD. Of course, a design consideration of the invention is to maximize access to the fluid conveying device FCD while providing an easily rotated shield 61 and structurally sound enclosure 60. In a preferred embodiment, a damping device, such as a rubber stopper, an absorber, and a spring-loaded type, may be provided as part of the hinge mechanism in communication between shield 61 and support 62 or back 63 or both so that the velocity of shield 61 is limited in the extreme open and closed positions for safety and ease of use. A damping device may also be provided between shield 61 and the ground.

Figure 22:
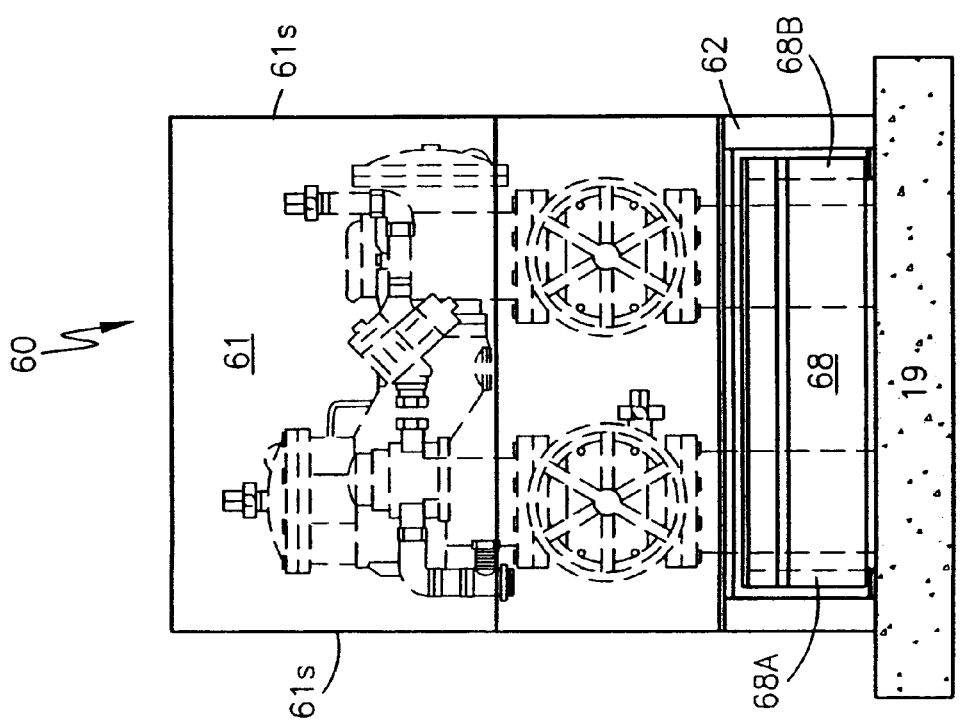
FIG. 22 is a side elevational view of an enclosure with a shield in a closed position constructed according to the principles of the invention.

FIGS. 22 and 23 depict enclosure 60 in front elevational views in closed and open positions, respectively. Door 68 is identical to door 6 described above with the exception that zees 5A and 5B are replaced by support angles 68A and 68B. Enclosure 60 may be supported by and attached to concrete slab 19. A heating arrangement (not shown), such as radiant heater 35, holder 34, thermostat 31, and associated structures may be disposed within enclosure 60 if environmental conditions dictate.

As shown in FIGS. 21 and 23, when shield 61 is rotated into an open position, access to the fluid conveying device FCD can be achieved from the top, the front and both sides. As is illustrated in FIG. 23, greater that 80% of the front portion of enclosure 60 is removed by the rotation of shield 61 to an open position.

Shield 61, support 62 and back 63 may be constructed of any material with enough strength and rigidity to form a structure able to support itself in its working environment under conditions of weather, vandalism and normal operation of the rotational movement of the shield 61. Preferred materials are aluminum, steel and rigid plastics of a thickness necessary to meet these criteria. In contrast with the prior art, one preferred combination of materials for which to construct enclosure 60 includes a much thicker outer layer, such as $\frac{1}{8}$" aluminum sheet, affixed, via of a silicone-based adhesive, to an inner layer of 1½" polyisocyanurate board sandwiched between two aluminum foil facers, such at THERMAX® by Celotex. This combination eliminates the need for additional structural members for support and is fire-rated and structurally sound.

What is claimed is:

1. Apparatus for protecting a fluid conveying device in fluid communication with valves and piping, comprising:

a shield, said shield having a proximal portion and a distal portion, a back and a support, said back communicating with said support, hinge points located in said back including rods rotatably connecting said shield to said back, wherein a centerline passes through said hinge points and lies in a vertical plane separating the apparatus into a forward portion and a rear portion, wherein said shield rotates about said rods at said hinge points between an open position where the proximal portion of said shield is located in the rear portion of the apparatus and a closed position where the proximal portion of said shield is located in the forward portion of the apparatus to allow access to the fluid conveying device.

2. The apparatus of claim 1, wherein said back has two opposing sides, wherein said support has two opposing sides, and wherein the sides of said support have a greater length than the sides of said back.

3. The apparatus of claim 1, wherein said back has two opposing sides, wherein said support has two opposing sides, and wherein the sides of said back have a greater length than the sides of said support.

4. The apparatus of claim 1, wherein said back has two opposing sides, wherein said support has two opposing sides, and wherein the sides of said support have an equal length to the sides of said back.

5. The apparatus of claim 1, wherein said apparatus has a height in a closed position, and wherein said hinge points are located above a midpoint of the height of said apparatus.

6. The apparatus of claim 1, wherein said apparatus has a height in a closed position, and wherein said hinge points are located below a midpoint of the height of said apparatus.

7. The apparatus of claim 1, wherein said apparatus has a height in a closed position, and wherein said hinge points are located at a midpoint of the height of said apparatus.

8. The apparatus of claim 1, further comprising a damping device, said damping device located between said support and said shield.

9. The apparatus of claim 1, further comprising a damping device, said damping device located between said back and said shield.

10. The apparatus of claim 1, further comprising a damping device, said damping device located between the ground and said shield.

11. The apparatus of claim 1, further comprising a water-resistant heater disposed in the lower portion of the apparatus.

12. The apparatus of claim 1, further comprising a door and a pivot connecting said door to said support, said pivot having a centroid, wherein the centroid of said pivot is located inside the apparatus so that said door is gravity closing.

13. Apparatus for protecting a fluid conveying device in fluid communication with valves and piping, comprising:

a shield, said shield having a proximal portion and a distal portion, a back and a support, said back communicating with said support, hinge points located in said support including rods rotatably connecting said shield to said support, wherein a centerline passes through said hinge points and lies in a vertical plane separating the apparatus into a forward portion and a rear portion, wherein said shield rotates about said rods at said hinge points between an open position where the proximal portion of said shield is located in the rear portion of the apparatus and a closed position where the proximal portion of said shield is located in the forward portion of the apparatus to allow access to the fluid conveying device.

14. The apparatus of claim 13, wherein said back has two opposing sides, wherein said support has two opposing sides, and wherein the sides of said support have a greater length than the sides of said back.

15. The apparatus of claim 13, wherein said back has two opposing sides, wherein said support has two opposing sides, and wherein the sides of said back have a greater length than the sides of said support.

16. The apparatus of claim 13, wherein said back has two opposing sides, wherein said support has two opposing sides, and wherein the sides of said support have an equal length to the sides of said back.

17. The apparatus of claim 13, wherein said apparatus has a height in a closed position, and wherein said hinge points are located above a midpoint of the height of said apparatus.

18. The apparatus of claim 13, wherein said apparatus has a height in a closed position, and wherein said hinge points are located below a midpoint of the height of said apparatus.

19. The apparatus of claim 13, wherein said apparatus has a height in a closed position, and wherein said hinge points are located at a midpoint of the height of said apparatus.

20. The apparatus of claim 13, further comprising a damping device, said damping device located between said support and said shield.

21. The apparatus of claim 13, further comprising a damping device, said damping device located between said back and said shield.

22. The apparatus of claim 13, further comprising a damping device, said damping device located between the ground and said shield.

23. The apparatus of claim 13, further comprising a water-resistant heater disposed in the lower portion of the apparatus.

24. The apparatus of claim 13, further comprising a door and a pivot connecting said door to said support, said pivot having a centroid, wherein the centroid of said pivot is located inside the apparatus so that said door is gravity closing.

* * * * *